(12) United States Patent
Gopal et al.

(10) Patent No.: US 11,164,148 B1
(45) Date of Patent: Nov. 2, 2021

(54) EVALUATION OF WEIGHT HYPOTHESES USING NON-WEIGHT DATA

(71) Applicant: AMAZON TECHNOLOGIES, INC., Seattle, WA (US)

(72) Inventors: Gopi Prashanth Gopal, Redmond, WA (US); Kun Qian, Seattle, WA (US); Ramanathan Palaniappan, Issaquah, WA (US); Navid Shiee, Seattle, WA (US); Jack G. Song, Maple Valley, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/073,791

(22) Filed: Oct. 19, 2020

Related U.S. Application Data

(63) Continuation of application No. 14/673,410, filed on Mar. 30, 2015, now Pat. No. 10,810,540.

(51) Int. Cl.
*G06Q 10/00* (2012.01)
*G06Q 10/08* (2012.01)
*G01G 19/387* (2006.01)

(52) U.S. Cl.
CPC ......... *G06Q 10/087* (2013.01); *G01G 19/387* (2013.01)

(58) Field of Classification Search
CPC .................... G06Q 10/087; G01G 19/387

USPC ......................................................... 235/385
See application file for complete search history.

(56) References Cited

U.S. PATENT DOCUMENTS

| | | | |
|---|---|---|---|
| 10,332,066 B1* | 6/2019 | Palaniappan | G01G 19/42 |
| 2013/0223673 A1* | 8/2013 | Davis | G06Q 30/00 |
| | | | 382/100 |
| 2013/0284806 A1* | 10/2013 | Margalit | G06Q 30/06 |
| | | | 235/382 |
| 2014/0362223 A1* | 12/2014 | LaCroix | G08B 13/19613 |
| | | | 348/150 |
| 2015/0041616 A1* | 2/2015 | Gentile | A47F 10/00 |
| | | | 248/550 |
| 2019/0188435 A1* | 6/2019 | Davis | G06K 9/3258 |

* cited by examiner

*Primary Examiner* — Daniel A Hess
(74) *Attorney, Agent, or Firm* — Lindauer Law, PLLC

(57) ABSTRACT

An inventory location, such as a shelf, may be used to stow different types of items in different areas of the shelf. Interactions may take place, such as the pick or place of items from the shelf. Weight data acquired from weight sensors at the shelf may be used to generate a set of hypotheses to describe types and quantities of items added to or removed from the shelf during an interaction. One or more of these hypotheses may be eliminated from consideration or selected as a solution based on activity data related to the shelf. The activity data is based on non-weight data from a non-weight sensor associated with the shelf. As an example, image data from a camera directed to the shelf can help identify presence of a user or a change in appearance at an area of the shelf to help evaluate hypotheses.

20 Claims, 11 Drawing Sheets

EVALUATION OF WEIGHT HYPOTHESES USING NON-WEIGHT DATA

PRIORITY

This application is a continuation of, and claims priority to, U.S. patent application Ser. No. 14/673,410, filed on Mar. 30, 2015, entitled "Item Determination Based On Weight Data", which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
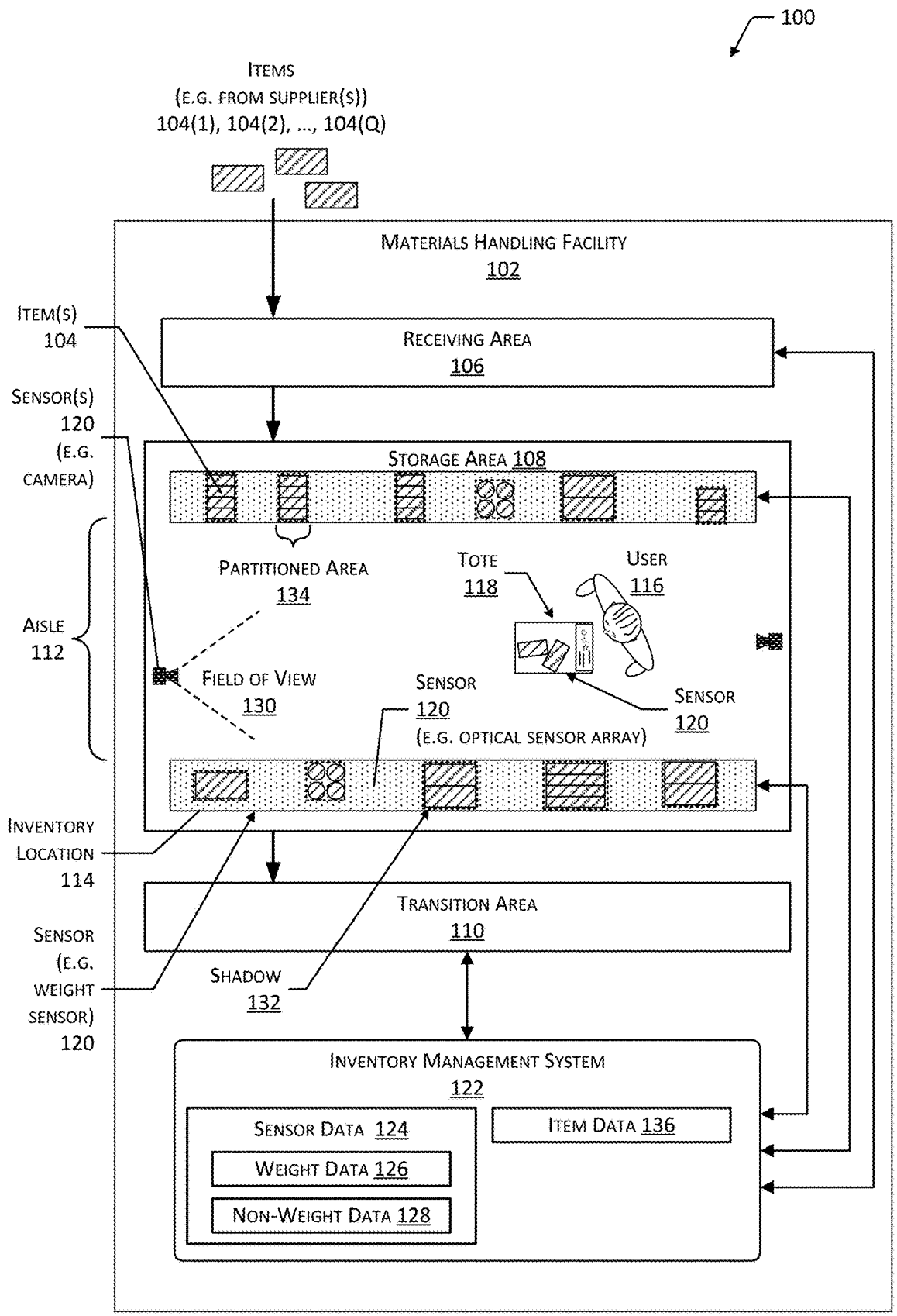
FIG. 1 is a block diagram illustrating a materials handling facility (facility) having weight sensors, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for processing weight data from weight sensors. The weight data may be used to determine interactions with items stowed or otherwise held in inventory locations in a materials handling facility (facility) or other setting. The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth.

Operation of the facility may be facilitated by using one or more sensors to acquire information about interactions in the facility. Interactions may comprise the user picking an item from an inventory location, placing an item at an inventory location, touching an item, bringing an object such as a hand or face close to an item, and so forth. For example, the inventory management system may use interaction data that indicates what item a user picked from a particular inventory location to adjust the count of inventory stowed at the particular inventory location.

Described in this disclosure are devices and techniques for gathering and processing weight data from one or more weight sensors. The weight sensors may be used to gather weight data about items stowed at an inventory location, such as a shelf. For example, load cells at or near each end of the shelf, at or near each of the four corners of a rectangular shelf, or in other configurations, may generate weight data indicative of a load at the inventory location.

The weight data may be used to determine data such as a quantity of items that have been picked from or placed to an inventory location, to determine the identity of an item that has been picked from or placed to the inventory location, and so forth. Use of weight sensors and the weight data they provide offers several operational benefits, especially in a materials handling facility or other facility. These benefits may include mechanical robustness, relatively low cost, fast response times, and so forth.

A single inventory location, such as a shelf, may have several partitioned areas, such as lanes within which items are arranged. Each partitioned area may correspond to an area, such as a lane, at the inventory location that is assigned to stow a particular item. For example, the inventory location may be a shelf having three lanes, with a different type of pet food in each lane. For example, a first lane may store "Cat Food", a second lane may store "Dog Food", and a third lane may store "Squirrel Food".

Weight data from the weight sensors is used to determine measured weight characteristics such as a measured weight change of the inventory location or a measured weight distribution of the inventory location. The weight distribution may be expressed as a weight at each weight sensor or as a sum from groups of weight sensors. For example, the weight distribution may be indicated as a left weight and a right weight, corresponding to the sum of weights from the respective side of the inventory location.

In the simple case where an inventory location only stows a single type of item, the measured change in the weight may be divided by a previously stored weight of a single item to determine a quantity that has been added or removed. However, in the situation where different partitioned areas stow different items, a weight change may be insufficient to allow for identification of the items.

Item data may be accessed that provides information about one or more of the items. This information may include the partitioned area(s) in which the item is known to be stowed, weight of an individual item, current quantity on hand, and so forth. Physical configuration data provides information about the inventory location, such as dimensions, position of the weight sensors, tare weight, and so forth.

Hypotheses data may be determined that describes various interactions that could occur with a particular inventory location. The hypotheses data may be based on item data, physical configuration data, and predicated data such as a predicted change in quantity to one of more of the items if they were added or removed to or from particular predicted partitioned areas in the inventory location. Each hypothesis may include a predicted weight change and a predicted weight distribution that is indicative of what the weight change and weight distribution would be, if the change in the predicted quantities of those predicted items were to occur.

In one implementation, a first set of hypotheses data may be determined. This set may be constrained to one or more of those hypotheses that have a predicted weight change that is within a threshold value of the measured weight change. For example, the threshold value may specify a percentage tolerance such as 5% or an absolute tolerance such as 300 grams. Those hypotheses that are outside of the tolerance may be omitted from the first set of hypotheses data. In some implementations, the threshold values may be dynamically adjusted. For example, a probability density function may be used to determine probability that a variance in weight is due to sensor error, rather than a measured change in load. This probability may be used to set or define the threshold value.

A subset of the first set of hypotheses may then be determined based on the measured weight distribution. For example, the subset may be limited to those hypotheses that have a predicted weight distribution that is within a threshold value of the measured weight distribution. In some implementations, the subset may also be determined based on activity data. The activity data may be determined using sensor data from non-weight sensors, such as a camera, optical sensor array, and so forth.

The hypotheses in the subset may be scored according to their correspondence to the measured weight characteristics, and then ranked according to the score. For example, a score may be determined for each hypothesis in the subset. The ranking score may comprise a product of a weight factor and a variance between the measured and the predicted weight characteristic. A hypothesis with a ranking score that is lower (indicative of a lesser variance) may be deemed to more accurately reflect the interaction as compared to a hypothesis with a relatively higher ranking score. In some implementations, the scoring may include an estimated error in the weight distribution using an estimated density function.

A single hypothesis of the subset may be determined and designated as being a solution indicative of the actual interaction. For example, the hypothesis having the least variance from the measured weight characteristics may be deemed to be a solution indicative of the interaction that occurred. In another example, the ranking score may be used to designate a single hypothesis. Should a situation arise in which a plurality of hypotheses in the subset are equally ranked, have variances within a threshold value, and so forth, other techniques may be used to determine the single hypothesis. For example, a hypothesis involving fewer different items may be selected over another hypothesis that involves a larger number of different items.

Interaction data indicative of the interaction with the inventory location may be determined using the predicted values of the designated hypothesis. The interaction data may provide information about an interaction, such as a pick of an item from the inventory location, a place of an item to the inventory location, and so forth. The interaction data may include one or more of the type of interaction, partitioned area involved, item identifier, quantity change to the item, user identifier, and so forth.

For example, the hypothesis designated as a possible solution may describe a pick of 5 cans of "Cat Food". Based on this information, interaction data may be generated that indicates a user has removed 5 cans of "Cat Food" from the inventory location.

The inventory management system may use the interaction data to maintain item data about the items in the facility. For example, where interaction data indicates a pick of a particular quantity of a particular item from a particular inventory location, the item data indicative of quantity on hand of that particular item at that particular location may be decreased accordingly. Continuing the example, the quantity on hand of "Cat Food" at the inventory location may be decreased by 5.

By using the devices and techniques described herein, operation of the facility may be improved. Details about interactions between users and items in the facility may be quickly and accurately determined. For example, as items are picked, placed, and so forth, information such as quantity on hand at a given time may be readily determined. As a result, the inventory management system may be able to quickly track what item a user has interacted with, maintain up-to-date item data, and so forth.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value greater than or equal to zero. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding, supporting, or storing the items 104. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U) and totes 118(1), 118(2), . . . , 118(T) or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the tote 118 may include a basket, cart, bag, bin, and so forth. In other implementations, other material handling apparatuses such as robots, forklifts, cranes, aerial drones, and so forth, may move about the facility 102 picking, placing, or otherwise moving the items 104. For example, a robot may pick an item 104 from a first inventory location 114(1) and move the item 104 to a second inventory location 114(2). In some implementations, at least a portion of the tote 118 may be designated as an inventory location 114 and may be equipped as described herein with weight sensors 120(6).

One or more sensors 120 may be configured to acquire information in the facility 102. The sensors 120 may include, but are not limited to, cameras, three-dimensional (3D) sensors, weight sensors, optical sensor arrays, proximity sensors, and so forth. The sensors 120 may be stationary or mobile, relative to the facility 102. For example, the inventory locations 114 may contain weight sensors 120(6) to acquire weight data of items 104 stowed therein, cameras to acquire images of picking or placement of items 104 on shelves, optical sensor arrays to detect shadows of the user's 116 hands at the inventory locations 114, and so forth. In another example, the facility 102 may include cameras to obtain images of the user 116 or other objects in the facility 102. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated in the facility 102.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

During operation of the facility 102, the sensors 120 may be configured to provide sensor data 124, or information based on the sensor data 124, to the inventory management system 122. The sensor data 124 may include weight data 126 obtained from weight sensors 120(6), non-weight data 128 obtained from other sensors 120 such as cameras 120(1), 3D sensors 120(2), optical sensor arrays 120(13), proximity sensors 120(14), and so forth. The sensors 120 are described in more detail below.

The weight data 126 comprises data generated by one or more weight sensors 120(6) configured to measure the weight of an inventory location 114 that may stow the items 104. For example, the weight sensor 120(6) may comprise a load cell beneath a load that may include a shelf or platform of the inventory location 114. By reading one or more characteristics of the load cell, the weight of the load may be determined.

The non-weight data 128 may comprise data generated by the non-weight sensors 120, such as cameras 120(1), 3D sensors 120(2), buttons 120(3), touch sensors 120(4), microphones 120(5), optical sensors 120(7), RFID readers 120(8), RF receivers 120(9), accelerometers 120(10), gyroscopes 120(11), magnetometers 120(12), optical sensor arrays 120(13), proximity sensors 120(14), and so forth. For example, cameras 120(1) may be arranged to have a field-of-view (FOV) 130 that includes at least a portion of the inventory location 114. Continuing the example, the camera 120(1) may be mounted above the inventory location 114 with the FOV 130 oriented to where the items 104 may be stowed during use.

The inventory management system 122 or other systems may use the sensor data 124 to track the location of objects within the facility 102, movement of the objects, or provide other functionality. Objects may include, but are not limited to, items 104, users 116, totes 118, and so forth. For example, a series of images acquired by the camera 120(1) may indicate removal by the user 116 of an item 104 from a particular location on the inventory location 114 and placement of the item 104 on or at least partially within the tote 118.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage in the storage area 108. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a user 116 may purchase or rent the items 104 and remove the items 104 from the facility 102. During use of the facility 102, the user 116 may move about the facility 102 to perform various tasks, such as picking or placing the items 104 in the inventory locations 114.

Objects such as an item 104, hand, robotic manipulator, retrieval tool, and so forth, may exhibit a shadow 132 with respect to the optical sensor array 120(13) at an inventory location 114. The shadow 132 is illustrated with a dotted line in this figure. In one implementation, the optical sensor array 120(13) may be located below the item 104, such as within a shelf upon or above which the item 104 is supported. The shadow 132 may be cast upon the optical sensor array 120(13). For example, where the optical sensor array 120(13) is on a vertical wall behind the items 104, the shadow 132 may comprise the shadow 132 cast on that wall.

The optical sensor array 120(13) may comprise one or more sensors 120, such as optical sensors 120(7). The optical sensors 120(7) may be arranged in a regular, repeating, or periodic two-dimensional arrangement such as a grid. Each of the optical sensors 120(7) may be configured to provide output indicative of a light intensity value. For example, the optical sensors 120(7) may generate an 8-bit value indicative of an intensity of light ranging from value 255 indicating maximum intensity to value 0 indicating minimum intensity. In another implementation, the light intensity value may be a 1-bit value of 0 or 1.

A single optical sensor array 120(13) may be associated with several different items 104. For example, the inventory location 114 may comprise a shelf that includes an optical sensor array 120(13). The shelf may have sufficient space to allow for storage of several different kinds of items 104. Items 104 may be grouped together and placed within a partitioned area 134. The partitioned area 134 may comprise a lane or row of identical items 104 positioned one in front of another. For example, a left half of the shelf may store a first kind of item 104(1), while a right half of the shelf may store a second kind of item 104(2). The inventory management system 122 may be configured to access partition data indicative of which portion of the optical sensor array 120(13), or an output thereof, is associated with a particular item 104.

The optical sensor array 120(13) may generate non-weight data 128 such as image data. The image data may comprise a plurality of pixels. Each pixel may correspond to a position within the two-dimensional arrangement of the optical sensors 120(7) and comprises the light intensity value from the optical sensor 120(7) at the position. In some implementations, the image data may comprise data from a subset of the optical sensors 120(7) within the optical sensor array 120(13). For example, the image data may comprise information from the optical sensors 120(7) corresponding to a particular partitioned area 134. In another example, image data from an optical sensor array 120(13) having a plurality of partitioned areas 134 may be segmented into the respective partitioned areas 134 for further processing.

The inventory management system 122 is configured to use the sensor data 124 and item data 136 to generate interaction data. The item data 136 may include information about the item 104, such as weight, appearance, where the item 104 is stowed, and so forth. The interaction data may provide information about an interaction, such as a pick of an item 104 from the inventory location 114, a place of an item 104 to the inventory location 114, a touch made to an item 104 at the inventory location 114, a gesture associated with an item 104 at the inventory location 114, and so forth.

The interaction data may include one or more of the type of interaction, partitioned area 134 involved, item identifier, quantity change to the item 104, user identifier, and so forth. The interaction data may then be used to further update the item data 136. For example, the quantity of items 104 on hand at a particular partitioned area 134 may be changed based on an interaction that picks or places one or more items 104.

The inventory management system 122 may use the sensor data 124 to determine the interaction. Weight characteristics about an interaction may be determined using the weight data 126. These weight characteristics may include weight before an interaction, weight after an interaction, amount of change in the weight of the inventory location 114, weight distribution of the inventory location 114 at the weight sensors 120(6), a change in the weight distribution of the inventory location 114, and so forth. For example, an inventory location 114 may stow a single type of item 104. A count of the quantity of items 104 picked or placed may be determined by dividing the change in weight associated with an interaction by the weight of a single item 104 as stored in the item data 136.

In some implementations, a single inventory location 114 may stow several different types of items 104, such as arranged in different partitioned areas 134 as described above. The inventory management system 122 may use the weight data 126 to determine weight characteristics, and use those weight characteristics to identify the item 104 that was picked or placed. For example, a change in the weight distribution, direction and distance of a change in the center-of-mass weight, and so forth, may be indicative of a pick or place of an item 104 to a particular partitioned area 134. The inventory management system 122 may also use the weight data 126 to determine the quantity picked or placed during an interaction, such as described above. However, in some situations, the same set of weight characteristics may correspond to several possible hypotheses. For example, given cans of approximately equal weight, placement of two cans of pet food at a first distance from an origin may result in the same weight distribution as a placement of one can at twice that distance from the origin. In some implementations, non-weight data 128 may be processed and used to select a particular hypothesis.

The inventory management system 122 may be configured to generate, access, or otherwise determine hypotheses having predicted weight characteristics that correspond to measured weight characteristics. Based on this correspondence, a particular hypothesis may be determined, and the predicted values of that hypothesis may be deemed to reflect the actual interaction.

In some implementations, the hypotheses may be selected based at least in part on a score. The score for a hypothesis may be calculated that describes the degree of correspondence between measured data from the sensor data 124 (or information based thereon) and the predicted value in a particular hypothesis. The scores may also be indicative of estimated error in the weight data 126. A lower score may be indicative of a closer correspondence between the hypothesis and the weight data 126 actually observed. For example, a low scoring hypothesis may predict values of a change in weight and change in center-of-mass that are within 5% of the measured weight data 126, while a higher scoring hypothesis may have values that are within 20%.

The process of using the weight data 126 to generate interaction data is discussed in more detail below. For example, FIGS. 9-11 describe various processes for determining a hypothesis based on information derived from weight data 126 and non-weight data 128.

In some implementations, items 104 may be processed, such as at the receiving area 106, to generate at least a portion of the item data 136. For example, an item 104 not previously stored by the inventory management system 122 may be placed on an optical sensor array 120(13) and a shadow 132 may be generated as part of a process to receive the item 104 into the facility 102. Continuing the example, the item data 136 generated may include acquiring the weight of a single item 104, determining a center-of-mass (COM) of the single item 104, an area of the shadow 132, absorption threshold comprising data indicative of transparency of the item 104, and so forth.

During configuration of the system 100, the weight distribution of a fully laden inventory location 114 may be stored, as well as the weight distribution of an inventory location 114 that is empty of items 104.

By using the weight data 126, the inventory management system 122 is able to maintain item data 136 such as inventory levels of a particular item 104 at a particular inventory location 114, generate billing information without manual intervention by a user 116, or provide other functions. For example, the user 116 may pick an item 104 from the inventory location 114. Using the interaction data based on the sensor data 124 and in conjunction with the item data 136, the inventory management system 122 may correctly determine that a quantity of one can of dog food has been picked and bill the user 116 accordingly for the sale price of the item 104.

Figure 2:
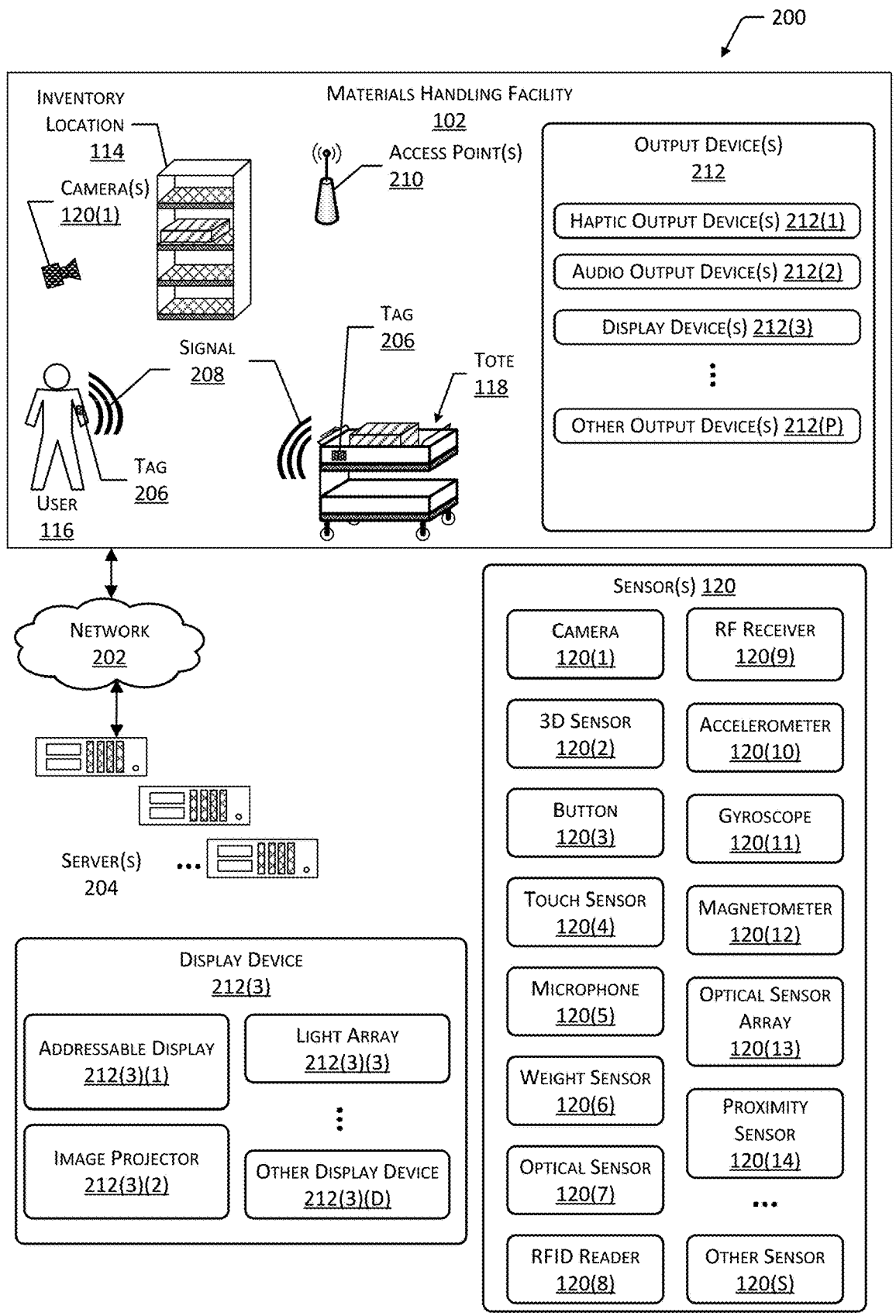
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cables, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite, and so forth), or other connection technologies.

The servers 204 may be configured to execute one or more modules or software applications associated with the inventory management system 122, and so forth. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 may be configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence of the tag 206. For example, an acoustic tag 206 may be configured to generate an ultrasonic signal 208, which is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, which may be read and, based at least in part on signal strength, used to determine identity and location.

Generally, the inventory management system 122 or other systems associated with the facility 102 may include any number and combination of input components, output components, and servers 204.

The one or more sensors 120 may be arranged at one or more locations within the facility 102, on the exterior of the facility 102, and so forth. For example, the sensors 120 may be mounted on or within a floor, wall, at a ceiling, at an inventory location 114, on a tote 118, may be carried or worn by a user 116, and so forth.

The sensors 120 may include one or more cameras 120(1) or other imaging sensors. The one or more cameras 120(1) may include imaging sensors configured to acquire images of a scene. The cameras 120(1) are configured to detect light in one or more wavelengths including, but not limited to, terahertz, infrared, visible, ultraviolet, and so forth. The cameras 120(1) may comprise charge coupled devices (CCD), complementary metal oxide semiconductor (CMOS) devices, microbolometers, and so forth. The inventory management system 122 may use image data acquired by the cameras 120(1) during operation of the facility 102. For example, the inventory management system 122 may identify items 104, users 116, totes 118, and so forth, based at least in part on their appearance within the image data acquired by the cameras 120(1). The cameras 120(1) may be mounted in various locations within the facility 102. For example, cameras 120(1) may be mounted overhead, on inventory locations 114, may be worn or carried by users 116, may be affixed to totes 118, and so forth.

One or more 3D sensors 120(2) may also be included in the sensors 120. The 3D sensors 120(2) are configured to acquire spatial or 3D data, such as depth information, about objects within a FOV 130 of a sensor 120. The 3D sensors 120(2) may include range cameras, lidar systems, sonar systems, radar systems, structured light systems, stereo vision systems, optical interferometry systems, and so forth. The inventory management system 122 may use the 3D data acquired by the 3D sensors 120(2) to identify objects, determine a location of an object in 3D real space, and so forth.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) to accept input from the user 116 and send information indicative of the input to the inventory management system 122.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking, enter a manual count of items 104 at an inventory location 114, and so forth.

One or more microphones 120(5) may be configured to acquire information indicative of sound present in the environment. In some implementations, arrays of microphones 120(5) may be used. These arrays may implement beamforming techniques to provide for directionality of gain. The inventory management system 122 may use the one or more microphones 120(5) to acquire information from acoustic tags 206, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, on the floor of the facility 102, and so forth. The weight sensors 120(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 120(6) may operate as transducers that generate one or more signals based on an applied force, such as that of the load due to gravity. For example, the weight sensor 120(6) may comprise a load cell having a strain gauge and a structural member that deforms slightly when weight is applied. By measuring a change in the electrical characteristic of the strain gauge, such as capacitance or resistance, the weight may be determined. The inventory management system 122 may use the data acquired by the weight sensors 120(6) to identify an object, determine a change in the quantity of objects, determine a location of an object, maintain shipping records, and so forth.

The sensors 120 may include one or more optical sensors 120(7). The optical sensors 120(7) may be configured to provide data indicative of one or more of color or intensity of light impinging thereupon. For example, the optical sensor 120(7) may comprise a photodiode and associated circuitry configured to generate a signal or data indicative of an incident flux of photons. As described below, the optical sensor array 120(13) may comprise a plurality of the optical sensors 120(7). For example, the optical sensor array 120(13) may comprise an array of ambient light sensors such as the ISL76683 as provided by Intersil Corporation of Milpitas, Calif., USA, or the MAX44009 as provided by Maxim Integrated, Inc. of San Jose, Calif., USA. In other implementations, other optical sensors 120(7) may be used. The optical sensors 120(7) may be sensitive to one or more of infrared light, visible light, or ultraviolet light. For example, the optical sensors 120(7) may be sensitive to infrared light, and infrared light sources such as LEDs may be used to provide illumination. The optical sensors 120(7) may include photodiodes, photoresistors, photovoltaic cells, quantum dot photoconductors, bolometers, pyroelectric infrared detectors, and so forth. For example, the optical sensor 120(7) may use germanium photodiodes to detect infrared light.

One or more radio frequency identification (RFID) readers 120(8), near field communication (NFC) systems, and so forth, may be included as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8) detecting the RF tag 206 at different times and RFID readers 120(8) having different locations in the facility 102, a velocity of the RF tag 206 may be determined.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

The sensors 120 may also include one or more gyroscopes 120(11). The gyroscope 120(11) may provide information indicative of rotation of an object affixed thereto. For example, the tote 118 or other objects may be equipped with a gyroscope 120(11) to provide data indicative of a change in orientation of the object.

One or more magnetometers 120(12) may be included as sensors 120. The magnetometer 120(12) may be used to determine an orientation by measuring ambient magnetic fields, such as the terrestrial magnetic field. The magnetometer 120(12) may be worn or carried by the user 116, mounted to the tote 118, and so forth. For example, the magnetometer 120(12) mounted to the tote 118 may act as a compass and provide information indicative of which direction the tote 118 is oriented.

As described above, the optical sensor array 120(13) may comprise one or more optical sensors 120(7). The optical sensors 120(7) may be arranged in a regular, repeating, or periodic two-dimensional arrangement such as a grid. The optical sensor array 120(13) may generate image data.

The sensors 120 may include proximity sensors 120(14) used to determine a presence of an object, such as the user 116, the tote 118, and so forth. The proximity sensors 120(14) may use optical, electrical, ultrasonic, electromagnetic, or other techniques to determine a presence of an object. In some implementations, the proximity sensors 120(14) may use an optical emitter and an optical detector to determine proximity. For example, an optical emitter may emit light, a portion of which may then be reflected by the object back to the optical detector to provide an indication that the object is proximate to the proximity sensor 120(14). In other implementations, the proximity sensors 120(14) may comprise a capacitive proximity sensor 120(14) configured to provide an electrical field and determine a change in electrical capacitance due to presence or absence of an object within the electrical field.

The proximity sensors 120(14) may be configured to provide sensor data 124 indicative of one or more of a presence or absence of an object, a distance to the object, or characteristics of the object. An optical proximity sensor 120(14) may use time-of-flight (ToF), structured light, interferometry, or other techniques to generate sensor data 124 such as distance. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor such as a camera 120(1). Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth.

In some implementations, a proximity sensor 120(14) may be installed at the inventory location 114. The non-weight data 128 generated by the proximity sensor 120(14) may be used in conjunction with the weight data 126 as described in this disclosure. For example, the optical proximity sensor 120(14) may generate non-weight data 128 indicative of the user 116 being within a threshold distance of an inventory location 114. Based on the non-weight data 128, the inventory management system 122 may generate activity data indicative of the presence of the user 116. By using the activity data, the inventory management system 122 may determine that the weight data 126 is reliable and subsequently use changes in the weight data 126 to change the item data 136 indicative of a quantity on hand.

The sensors 120 may include other sensors 120(S) as well. For example, the other sensors 120(S) may include light curtains, ultrasonic rangefinders, thermometers, barometric sensors, hygrometers, biometric input devices including, but not limited to, fingerprint readers or palm scanners, and so forth. For example, the inventory management system 122 may use information acquired from thermometers and hygrometers in the facility 102 to direct the user 116 to check on delicate items 104 stored in a particular inventory location 114, which is overheating, too dry, too damp, and so forth.

In one implementation, the light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the inventory location 114, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 116 hand would prevent some light from the light emitters from reaching a corresponding light detector. As a result, a position along the linear array of the object may be determined. This position may be expressed as the touchpoint data, with the touchpoint being indicative of the intersection between the hand of the user 116 and the sheet of infrared light. In some implementations, a pair of light curtains may be arranged at right angles relative to one another to provide two-dimensional touchpoint data indicative of a position of touch in a plane.

In some implementations, the camera 120(1) or other sensors 120 may include hardware processors, memory, and other elements configured to perform various functions. For example, the cameras 120(1) may be configured to generate image data, send the image data to another device such as the server 204, and so forth.

The facility 102 may include one or more access points 210 configured to establish one or more wireless networks. The access points 210 may use Wi-Fi, NFC, Bluetooth, or other technologies to establish wireless communications between a device and the network 202. The wireless networks allow the devices to communicate with one or more of the sensors 120, the inventory management system 122, the optical sensor arrays 120(13), the tag 206, a communication device of the tote 118, or other devices.

Output devices 212 may also be provided in the facility 102. The output devices 212 are configured to generate signals, which may be perceived by the user 116 or detected by the sensors 120. In some implementations, the output devices 212 may be used to provide illumination of the optical sensor array 120(13).

Haptic output devices 212(1) are configured to provide a signal that results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal, which produces an apparent tactile sensation in one or more fingers of the user 116. In another example, the haptic output devices 212(1) may comprise piezoelectric or rotary motor devices configured to provide a vibration, which may be felt by the user 116.

One or more audio output devices 212(2) may be configured to provide acoustic output. The acoustic output includes one or more of infrasonic sound, audible sound, or ultrasonic sound. The audio output devices 212(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 212(3) may be configured to provide output, which may be seen by the user 116 or detected by a light-sensitive sensor such as a camera 120(1) or an optical sensor 120(7). In some implementations, the display devices 212(3) may be configured to produce output in one or more of infrared, visible, or ultraviolet light. The output may be monochrome or color.

The display devices 212(3) may be emissive, reflective, or both. An emissive display device 212(3) is configured to emit light during operation. For example, the emissive display device 212(3) may produce an image using LEDs. In comparison, a reflective display device 212(3) relies on ambient light to present an image. For example, the reflective display device 212(3) may use an electrophoretic element that emits no light. Backlights or front lights may be used to illuminate non-emissive display devices 212(3) to provide visibility of the output in conditions where the ambient light levels are low.

The display devices 212(3) may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 212(3) may use a light source and an array of MEMS-controlled mirrors to selectively direct light from the light source to produce an image. These display mechanisms may be configured to emit light, modulate incident light emitted from another source, or both. The display devices 212(3) may operate as panels, projectors, and so forth.

The display devices 212(3) may be configured to present images. For example, the display device 212(3) may comprise an addressable display 212(3)(1). The addressable display 212(3)(1) may comprise elements that may be independently addressable to produce output, such as pixels. For example, the addressable display 212(3)(1) may produce an image using a two-dimensional array of pixels.

In some implementations, the display devices 212(3) may be configured to provide non-image data, such as text characters, colors, and so forth. For example, an addressable display 212(3)(1) may comprise a segmented electrophoretic display device 212(3), segmented LED, and so forth. The addressable display 212(3)(1) may be used to present information such as a stock keeping unit (SKU) number, quantity on hand, and so forth. The display devices 212(3) may also be configurable to vary the color of the segment, such as using multicolor/multi-wavelength LED segments.

The display devices 212(3) may include image projectors 212(3)(2). For example, the image projector 212(3)(2) may be configured to project an image onto objects, illuminate at least a portion of an optical sensor array 120(13), and so forth. The image may be generated using MEMS, LCOS, lasers, and so forth.

The display devices 212(3) may include a light array 212(3)(3). The light array 212(3)(3) may comprise a plurality of discrete emissive elements configurable to emit light. The discrete emissive elements (or assemblies thereof) may be separated from one another by a distance such that, when image data of the light array 212(3)(3) is acquired, one emissive element may be distinguished from another. For example, the light array 212(3)(3) may comprise a plurality of infrared LEDs separated by at least 0.5 centimeters.

Other display devices 212(3)(D) may also be used in conjunction with the facility 102. The display devices 212(3) may be located at various points within the facility 102. For example, the addressable displays 212(3)(1) or the light arrays 212(3)(3) may be located on inventory locations 114, totes 118, in or on the floor of the facility 102, and so forth.

Other output devices 212(P) may also be present. For example, the other output devices 212(P) may include scent/odor dispensers, document printers, 3D printers or fabrication equipment, and so forth.

Figure 3:
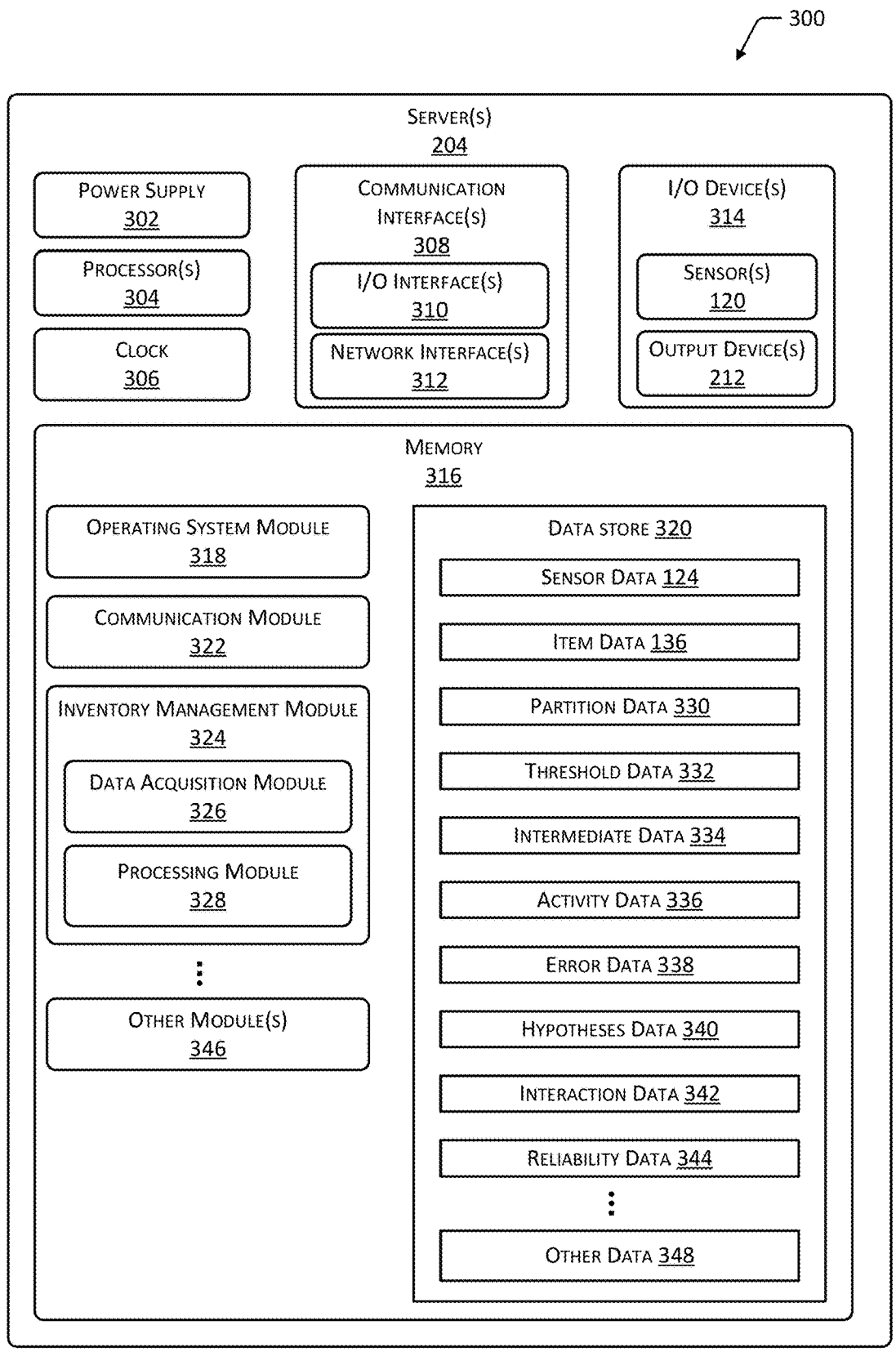
FIG. 3 is a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 may be configured to provide electrical power suitable for operating the components in the server 204. The one or more power supplies 302 may comprise batteries, capacitors, fuel cells, photovoltaic cells, wireless power receivers, conductive couplings suitable for attachment to an external power source such as provided by an electric utility, and so forth. The server 204 may include one or more hardware processors 304 (processors) configured to execute one or more stored instructions. The processors 304 may comprise one or more cores. One or more clocks 306 may provide information indicative of date, time, ticks, and so forth. For example, the processor 304 may use data from the clock 306 to associate a particular interaction with a particular point in time.

The server 204 may include one or more communication interfaces 308 such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 212 such as one or more of a display device 212(3), printer, audio speakers, and so forth. In some embodiments, the I/O devices 314 may be physically incorporated with the server 204 or may be externally placed.

The network interfaces 312 may be configured to provide communications between the server 204 and other devices, such as the totes 118, routers, access points 210, and so forth. The network interfaces 312 may include devices configured to couple to personal area networks (PANS), local area networks (LANs), wide area networks (WANs), and so forth. For example, the network interfaces 312 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 3, the server 204 includes one or more memories 316. The memory 316 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the server 204. A few example functional modules are shown stored in the memory 316, although the same functionality may alternatively be implemented in hardware, firmware, or as a system on a chip (SOC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320, or a portion thereof, may be distributed across one or more other devices including the servers 204, network attached storage devices, and so forth.

A communication module 322 may be configured to establish communications with one or more of the totes 118, sensors 120, display devices 212(3), other servers 204, or other devices. The communications may be authenticated, encrypted, and so forth.

The memory 316 may store an inventory management module 324. The inventory management module 324 is configured to provide the inventory functions as described herein with regard to the inventory management system 122. For example, the inventory management module 324 may track items 104 between different inventory locations 114, to and from the totes 118, and so forth.

The inventory management module 324 may include one or more of a data acquisition module 326 or a processing module 328. The data acquisition module 326 may be configured to acquire and access information associated with operation of the facility 102. For example, the data acquisition module 326 may be configured to acquire sensor data 124 from one or more of the sensors 120. This information may be stored in the data store 320 as part of the sensor data 124.

The processing module 328 may be configured to use one or more of sensor data 124, item data 136, partition data 330, threshold data 332, or other information to generate intermediate data 334. One or more of the sensor data 124 or the intermediate data 334 may be used to generate activity data 336. In some implementations, the activity data 336 may be used to select one or more hypotheses of the hypotheses data 340.

The threshold data 332 may comprise one or more thresholds associated with operation of the processing module 328. For example, the threshold data 332 may specify a tolerance or accepted extent of deviation permitted between a hypothesis and the observed sensor data 124. In another example, the threshold data 332 may include a threshold indicating a minimum count of pixels that, if different, designate a change has occurred in image data. The threshold data 332 may include other thresholds, such as an interaction threshold period, and so forth. In some implementations, the threshold data 332 may include constraint data, such as described below that may be used to constrain the hypotheses data 340.

In some implementations, the threshold data 332 may be based on the error data 338. For example, the threshold values may be dynamically adjusted. A probability density function may be used to determine probability that a variance in weight is due to sensor error, rather than an actual change in load. This probability may be used to set or define the threshold value.

Error data 338 may be stored in the data store 320. The error data 338 may comprise one or more probability density functions. The probability density functions describe weight sensor error as a function of weight measured. For example, the probability density function may indicate that a change in weight of 400 g as measured by the weight sensor 120(6) of the inventory location 114 has a probability of 0.01 of occurring as a result of noise or sensor error.

The probability density function may be determined based on theoretical modelling, weight data 126 obtained from weight sensors 120(6), or a combination thereof. For example, the weight data 126 may be obtained by picking and placing objects of known weights onto a representative inventory location 114 equipped with weight sensors 120(6) and comparing the known weight to the weight recorded. Different probability density functions, and corresponding error data 338, may be associated with different designs of inventory location 114. For example, an inventory location 114 that is configured to store dry items 104 may have a different probability density function than an inventory location 114 that is configured to store frozen items 104.

In some implementations, the error data 338 may comprise a lookup table based on the probability density function. In other implementations, an equation or expression descriptive of the probability density function may be used to determine the probability associated with a particular weight.

The hypotheses data 340 may comprise different combinations of values for variables and the corresponding predicted weight characteristics based on those different values. The variables may include quantities of items 104, placement of the item 104 within the partitioned areas 134 of a particular inventory location 114, and so forth. The hypotheses data 340 may be at least partially precomputed given the item data 136 indicating what items 104 are intended to be stored in the particular partitioned areas 134 of the inventory location 114.

For example, the hypotheses data 340 may comprise a data structure with information such as:

Hypothesis 1=Quantity of 2 cans of pet food SKU #12345 removed from partitioned area 134(1) exhibits a weight distribution of 3213 g left and 2214 g right, and a change in weight of 910 g.

Hypothesis 2=Quantity of 1 can of pet food SKU #12345 removed from partitioned area 134(2) and quantity of 2 cans of pet food SKU #67890 removed from partitioned area 134(1) exhibits a weight distribution of 2523 g left and 2424 g right, and a change in weight of 1390 g.

Hypothesis 3=Quantity of 1 box of pet food SKU #88771 removed from partitioned area 134(3) exhibits a weight distribution of 3523 g left and 1917 g right, and a change in weight of 897 g.

In some implementations, the hypotheses data 340 may omit the data indicative of which partitioned area 134 the item 104 is removed from, and the entire inventory location 114 may be considered. The hypotheses data 340 may include other weight characteristics, such as position of a center-of-mass (COM), direction of a change in the COM from one time to another, location of a weight change (LWC), and so forth. For example, instead of or in addition to the weight distribution, the COM of the inventory location 114 may be determined using measured weight data 126 and compared with a predicted COM in the hypotheses data 340.

In another example, the hypotheses data 340 may include a predicted change in the weight distribution data. A change in the weight distribution data may be obtained by subtracting weight distribution data associated with a first time from weight distribution data associated with a second time. The actual change in the weight distribution data may be compared with the predicted change in weight distribution data to select a solution.

In some implementations, the hypotheses data 340 may be constrained. For example, the hypotheses data 340 may exclude situations such as a simultaneous pick and place of items 104 in the same interaction, simultaneous removal of items 104 from different partitioned areas 134, interactions involving a minimum or maximum number of items 104, and so forth. Continuing the example, constraint data may be specified that limits the hypotheses data 340 to those hypotheses that do not have predicted quantities that exceed the stowage capacity of the inventory location 114, the partitioned area 134, and so forth. For example, the constraint data may be used to limit the hypotheses that are generated or included in the hypotheses data 340. In other implementations, the constraint data may be used to disregard particular hypotheses present in the hypotheses data 340 from further consideration. For example, a hypothesis having a predicted value or a value based on a predicated value that exceeds a threshold specified by the constraint data may be disregarded and not used to determine a solution.

By using the sensor data 124, a particular hypothesis may be selected from the hypotheses data 340 and deemed to be true or accurate given the information available. The information from the selected hypothesis may then be deemed a solution and used to generate interaction data 342. The interaction data 342 may be used to change item data 136, track objects, and so forth. For example, suppose the actual interaction produces weight data 126 indicating actual weight characteristics of a measured weight distribution of 2215 g left and 2207 g right and a measured weight change of 905 g. Based on the measured weight change of 905 g, Hypotheses 1 or 3 may be correct within the tolerance of error specified by the threshold data 332. Hypothesis 2 is discarded as it exhibits a predicted change in weight that is beyond the tolerance of error.

To disambiguate between Hypotheses 1 and 3, the processing module 328 may use other weight characteristics, such as the weight distribution, COM, and so forth. Continuing the example, Hypothesis 1 has a predicted weight distribution of 3213 g left and 2214 g right while Hypothesis 3 has a predicted weight distribution of 3523 g left and 1917 g right. The variance between the measured and the predicted weight distribution values for Hypothesis 1 is less than that of Hypothesis 3. As a result, Hypothesis 3 may be discarded, and Hypothesis 1 may be deemed to be a correct solution. The interaction data 342 generated from the solution may then indicate that 2 cans of pet food having SKU #12345 were removed from the partitioned area 134(1). The quantity on hand at that partitioned area 134(2) may be decreased accordingly, and the quantity determined to be in possession of the user 116 may be increased accordingly.

In other implementations, the error data 338 may be used to select a particular hypothesis from the hypotheses data 340. For example, the error data 338 may be used to determine a probability that a variance between the predicted weight distribution and the measured weight distribution is due to a sensor error. A high probability may indicate that the particular variance is the result of a sensor error and not a change in load. The processing module 328 may generate a score based on the probability. As a result, the hypotheses with the highest score may be selected as the correct solution.

The processing module 328 may generate reliability data 344 indicative of the reliability of weight data 126 based on non-weight data 128. For example, the reliability data 344 may indicate that the weight data 126 is unreliable when no activity at the inventory location 114 is detected. As a result, spurious data is not processed, preventing incorrect changes in quantity on hand, or other effects.

Operation of the processing module 328 and the various data involved including the intermediate data 334, activity data 336, hypotheses data 340, reliability data 344, and so forth, is discussed in more detail below.

Processing of the sensor data 124, intermediate data 334, or other data may be performed by the processing module 328 or other modules implementing, at least in part, one or more of the following tools or techniques. In one implementation, processing described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 124.

Techniques such as artificial neural networks (ANN), active appearance models (AAM), active shape models (ASM), principal component analysis (PCA), cascade classifiers, and so forth, may also be used to process the sensor data 124, the intermediate data 334, the activity data 336, or other data. For example, the ANN may be a trained using a supervised learning algorithm such that object identifiers are associated with images of particular objects within training images provided to the ANN. Once trained, the ANN may be provided with the sensor data 124 such as the image data 422 from a camera 120(1), and may provide, as output, the object identifier. In another example, cascade classifiers may be used for facial recognition, such as the Viola and Jones face detection algorithm.

Other modules 346 may also be present in the memory 316 as well as other data 348 in the data store 320. For example, the other modules 346 may include an accounting module while the other data 348 may include billing data. The accounting module may be configured to assess charges to accounts associated with particular users 116 or other entities, while the billing data may include information such as payment account numbers. In some implementations, the other data 348 may include physical configuration data. The physical configuration data may indicate dimensions of an inventory location 114, placement of weight sensors 120(6), tare weight of the inventory location 114, and so forth.

Figure 4:
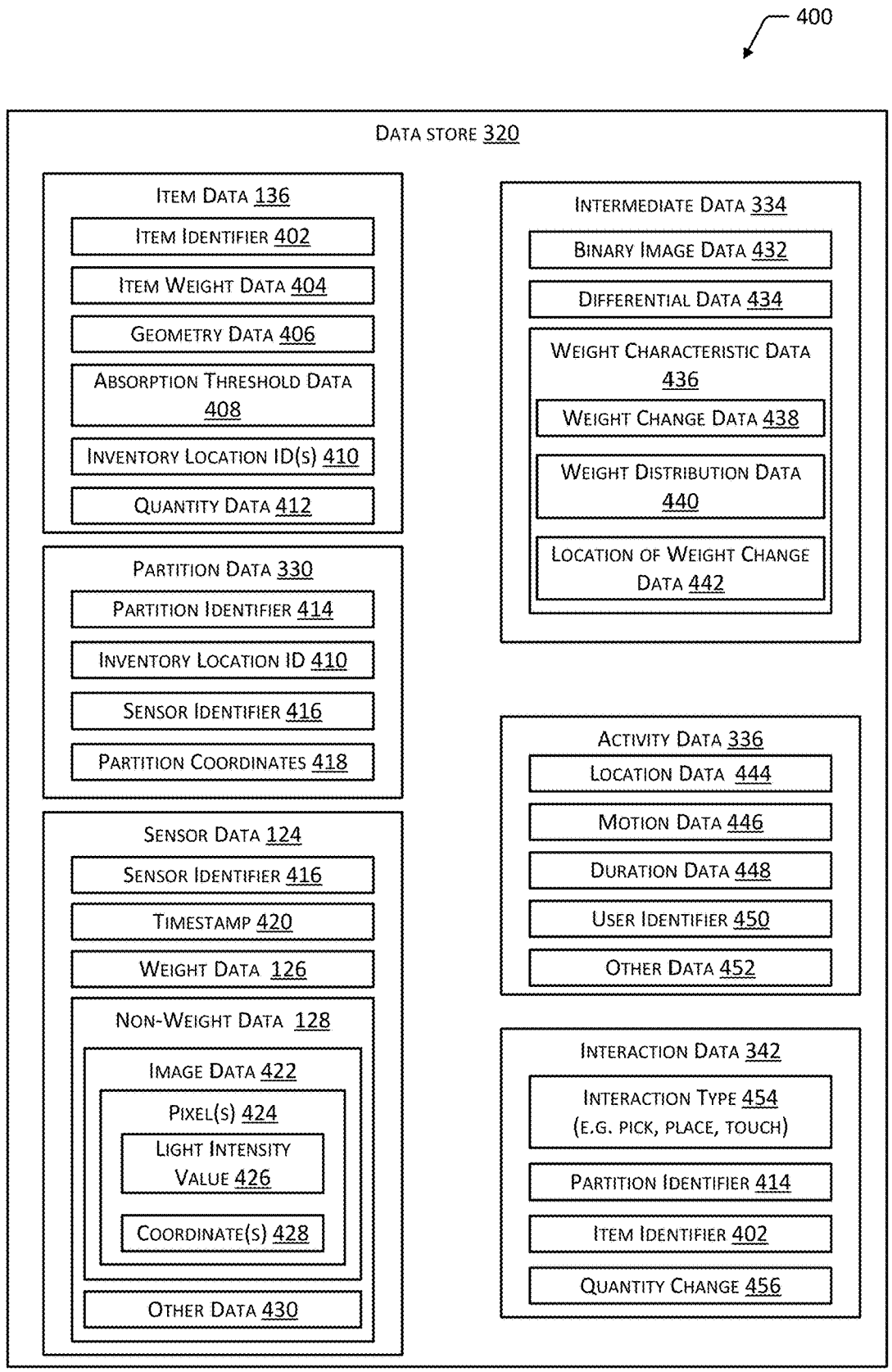
FIG. 4 is a block diagram of additional data that may be used by the server to support operation of the facility, according to some implementations.

FIG. 4 is a block diagram 400 of additional data that may be used by the server 204 to support operation of the facility 102, according to some implementations. This data may be stored at least in part by the data store 320. As described above with regard to FIG. 3, the inventory management module 324 may use the sensor data 124 to generate other information such as interaction data 342 indicative of what item 104 a user 116 has interacted with.

The processing module 328 may access item data 136. The item data 136 may include an item identifier 402. The item identifier 402 may be used to distinguish one item 104 from another. For example, the item identifier 402 may include a SKU, Universal Product Code (UPC) number, and so forth. The items 104 that are of the same type may be referred to by the same item identifier 402. For example, 450 g cans of dog food may be represented by the item identifier 402 value of "9811901181". In other implementations, non-fungible items 104 may each be provided with a unique item identifier allowing each item 104 to be distinguished from one another.

The item data 136 may include one or more of item weight data 404, geometry data 406, or absorption threshold data 408. The item weight data 404 comprises information indicative of a weight of the item 104, package, kit, or other grouping considered to be a single item 104. The geometry data 406 may comprise information indicative of an area of a shadow 132 of the item 104, within an image of the item 104 acquired by a camera 120(1), and so forth. For example, the geometry data 406 may comprise an area as measured in pixels, square centimeters, and so forth. The geometry data 406 may be for a single item 104 or a package or kit of objects considered to be a single item 104.

The geometry data 406 may also comprise information indicative of the shape of the item 104, such as in the shadow 132, an image acquired from a camera 120(1), and so forth. The geometry data 406 may comprise information indicative of one or more contours of the item 104. For example, the geometry data 406 may comprise information indicating that the shadow 132 of the item 104 is a rectangle measuring three pixels by seven pixels.

The absorption threshold data 408 provides information indicative of how transparent the item 104 is to the light detected by the optical sensor array 120(13). For example, the absorption threshold data 408 may comprise a $75^{th}$ percentile value of the light intensity values of the pixels that are within a contour of the shadow 132 of the single item 104. The absorption threshold data 408 may be used to generate intermediate data 334, such as binary image data described below. Generation of the absorption threshold data 408 is discussed below in more detail.

The item data 136 may include one or more inventory location identifiers (IDs) 410. The inventory location IDs 410 are indicative of a particular inventory location 114 that is designated for stowage of the item 104. The item data 136 may also include quantity data 412. The quantity data 412 may comprise a count or value indicative of a number of items 104. The count may be a measured or estimated value. The quantity data 412 may be associated with a particular inventory location ID 410, such as when the same item 104 is stowed at several different inventory locations 114 or in a particular partitioned area 134. In other implementations, the item data 136 may include other data, such as an image of the item 104.

The partition data 330 may include one or more of a partition identifier 414, inventory location ID 410, a sensor identifier 416, or partition coordinates 418. As described above, a single inventory location 114 with an optical sensor array 120(13) may stow several different kinds of items 104, with each item 104 being associated with a different item identifier 402. For example, the optical sensor array 120(13) may be incorporated into a shelf of the inventory location 114. Three different items 104(1), 104(2), and 104(3) may be stored on that same shelf serviced by a single optical sensor array 120(13), with each item 104 in a partitioned area 134(1), 134(2), 134(3), respectively.

The partition identifier 414 comprises data indicative of a particular partitioned area 134. The partition identifier 414 may be unique in the context of a particular inventory location 114, aisle 112, facility 102, or globally across multiple facilities 102. The inventory location ID 410 included in the partition data 330 may associate the particular partition identifier 414 with a particular inventory location 114. The particular inventory location 114 may then be associated with the item identifier 402 indicative of the items 104 stored therein.

The sensor identifier 416 comprises data indicative of a particular sensor 120, such as a certain camera 120(1), optical sensor array 120(13), proximity sensor 120(14), and so forth. The sensor identifier 416 may be unique in the context of a particular inventory location 114, aisle 112, facility 102, or globally across multiple facilities 102.

The partition coordinates 418 may specify an area that encompasses the partitioned area 134. For example, the partition coordinates 418 may specify the location in space with respect to an origin of two or more of corners of a rectangular partitioned area 134, a distance relative to an origin, and so forth.

The sensor data 124 may be generated or acquired by one or more sensors 120. The sensor data 124 may include one or more of the sensor identifiers 416, a timestamp 420, weight data 126, or non-weight data 128. The timestamp 420 may comprise information indicative of a time when the sensor data 124 was acquired. For example, the timestamp 420 may be based at least in part on time data obtained from a clock onboard the sensor 120, by the clock 306 on the server 204, and so forth. The inventory management module 324 may use the timestamp 420 to associate weight data 126 with non-weight data 128 and a corresponding time.

As described above, the sensor data 124 may be broadly categorized as comprising weight data 126 and non-weight data 128. For example, the weight data 126 may comprise information obtained from one or more the weight sensors 120(6). Conversely, the non-weight data 128 may comprise information obtained from the sensors 120 other than the weight sensors 120(6). For example, the non-weight data 128 may be obtained from the cameras 120(1), 3D sensors 120(2), optical sensors 120(7), optical sensor arrays 120(13), proximity sensors 120(14), and so forth.

In some implementations, the non-weight data 128 may comprise image data 422. The image data 422 may be obtained from one or more sensors 120, such as a camera 120(1), a 3D sensor 120(2), or optical sensor array 120(13). The image data 422 may comprise one or more pixels 424. In one implementation, the image data 422 may be represented as a two-dimensional matrix.

In the implementation where the image data 422 is provided by an optical sensor array 120(13), the pixels 424 may comprise data acquired from one or more of the optical sensors 120(7). For example, a single optical sensor 120(7) may be represented by a single pixel 424. Each pixel 424 may include information indicative of a light intensity value 426. The light intensity value 426 provides information indicative of a flux of light impinging upon the optical sensor 120(7) at a particular time. For example, the light intensity value 426 may comprise an 8 or 16-bit value produced by the optical sensor 120(7). The pixel 424 may also include information indicative of a coordinate 428 or relative position of the pixel 424 with respect to other pixels 424 or an origin point. For example, the coordinates 428 may indicate that a particular pixel 424 is at an intersection of a particular row and column. The coordinates 428 may express a relative position within the two-dimensional arrangement of the optical sensor array 120(13).

In some implementations, the pixels 424 may also include color or spectral data. For example, each pixel 424 may have a plurality of light intensity values 426, with each of the light intensity values 426 indicative of an intensity of a different wavelength or range of wavelengths of light.

The sensor data 124 may include other data 430. For example, other data 430 may include information indicative of operational status of the sensor 120, error messages associated with the sensor 120, and so forth.

The processing module 328 may access the item data 136, the partition data 330, and the sensor data 124 to generate intermediate data 334. For example, the processing module 328 may access threshold data 332 and the image data 422 to generate binary image data 432.

The threshold data 332 may include a binary image threshold value used to distinguish whether a pixel 424 in the resulting binary image data 432 will be designated as a binary "0" value or binary "1" value. For example, the binary image data 432 may be generated by comparing the light intensity value 426 of each pixel 424 with a threshold value. In this example, the threshold value may be an 8-bit value of "50". The pixels 424 having light intensity value 426 below 50 may result in a pixel 424 in the binary image data 432 having a binary value of "1". In other implementations, the opposite values may be used, such as values below the threshold value being assigned a binary value of "0".

By thresholding in this fashion, the resulting binary image data 432 may be more easily processed to determine characteristics such as shape, area, perimeter, edges or contours. For example, the OpenCV function "threshold" may be used to generate the binary image data 432. In other implementations, other thresholding techniques may be used.

The processing module 328 may be configured to generate contour data using the binary image data 432. The contour data may provide information indicative of a shape having a closed or complete perimeter. In some implementations, the contour data may be indicative of a curve or open perimeter. For example, an edge appearing in the shadow 132 may be incomplete. This may occur due to an optical anomaly, erroneous reading by an optical sensor 120(7), and so forth. The processing module 328 may be configured to close an open perimeter.

The contour data may comprise the coordinates 428 of the pixels 424 within the binary image data 432 having a binary value of "1" or "0". In other implementations, the contour data may comprise a vector value, matrix of values, or other information representative of the perimeter of a shadow 132. For example, the OpenCV function "FindContours" may be used to generate the contour data. Other functions may be used to generate the contour data. For example, the OpenCV function "contourArea" may be used to process the binary image data 432 to generate the geometry data 406. The geometry data 406 may be indicated in terms of pixels 424, units of linear measurement, and so forth.

In some implementations, the binary image data 432 may be further processed to reduce noise, simplify later processing, and so forth. For example, an erosion function may be applied to the binary image data 432. In one implementation, where the contour is represented by binary "1"s, in the binary image data 432, the erosion function may be configured to set to a value of "0" those pixels 424 adjacent to, but not part of, a contour. For example, the OpenCV function "erode" may be used. In some implementations, the erosion may use a 1 pixel neighborhood boundary. Second binary image data 432 may be generated as a result of this processing, or the original binary image data 432 may be modified.

The intermediate data 334 may also comprise differential data 434. The differential data 434 may result from a comparison between image data 422 at different times and may be indicative of a change or difference when one occurs.

For example, the differential data 434 may comprise a value indicating that the particular image data 422 has changed relative to earlier image data 422. The differential data 434 may simplify processing by removing "background" such as those items 104 that were left untouched.

The differential data 434 may comprise one or more differential images. The differential images may result from comparison of one binary image with another, one frame of image data 422 with another, and so forth. In one implementation, a first image sensor data 124(1) may be subtracted from a second image sensor data 124(2). For example, the light intensity values 426 of a pixel 424 in the first image sensor data 124(1) may be subtracted from a corresponding pixel 424 at the same coordinates in the second image sensor data 124(2). The subtraction may be accomplished using the "cvSub( )" function of OpenCV.

The extent of change between the first image data 422(1) and the second image data 422(2) may be quantified by assessment of the differential image. In one implementation, pixels 424 in the differential image having a non-zero light intensity value 426 are those that exhibited a change. The pixels 424 in the differential image may be counted, a contour determined from the pixels 424, and so forth.

The processing module 328 may use the differential data 434 to determine a state of the image data 422 at a particular time. The image data 422 may be deemed to be "stable" when the number of changes for a particular period of time is below a threshold value in the threshold data 332. Similarly, the image data 422 may be deemed to be "unstable" when the number of changes for the particular period of time is greater than or equal to the threshold value. For example, the threshold value may specify a number of non-zero pixels. Continuing the example, where the threshold value is 1, differential images having one or fewer pixels 424 may be deemed to indicate a stable state of the latest image data 422 obtained. As described below, information about whether the image data 422 is in a stable or unstable state may be used to distinguish an actual interaction from noise or a spurious event.

The processing module 328 may also generate intermediate data 334 such as an interaction duration. The interaction duration may indicate a length of time the image data 422 was deemed to be in an unstable state. For example, the interaction duration may be the time elapsed between the end of a first stable state and the beginning of a second stable state. In some implementations, the processing module 328 may use an interaction threshold period stored in the threshold data 332 to prevent transient signals from generating interaction data 342. For example, the interaction threshold period may be 500 milliseconds (ms). Image data 422 for which the unstable state is greater than 500 ms may be processed and subsequently result in the generation of interaction data 342. In comparison, image data 422 having an unstable state that is less than 500 ms in duration may be disregarded as noise or a spurious event.

Intermediate data 334 may also include weight characteristic data 436. The weight characteristic data 436 may be generated by processing the weight data 126. The weight characteristic data 436 may include weight change data 438, weight distribution data 440, location of weight change data 442, or other data, such as weight at a particular instant in time.

The weight change data 438 is indicative of a change in weight measured by one or more of the weight sensors 120(6) from a first time to a second time. For example, calculation of the weight change data 438 may comprise subtracting a first weight obtained at a first time from the second weight obtained at the second time. In some implementations, the inventory management module 324 may determine the weight change data 438. In other implementations, the determination of the weight change data 438 may be performed at least partially onboard the weight sensor 120(6) or an associated device such as a controller. In some implementations, the weight change data 438 may include information indicative of noise in the weight data 126, variability of the weight data 126, estimated reliability of the weight data 126, and so forth.

The weight distribution data 440 may provide data indicative of weight distribution at a particular time. The weight distribution data 440 may be expressed as a measured weight at a particular weight sensor 120(6), a ratio or percentage of weight on a weight sensor 120(6), and so forth. For example, the weight distribution data may be expressed as "3213 g left, 2214 g right", "0.59 left, 0.41 right", and so forth. In some implementations, the inventory management module 324 may determine the weight distribution data 440. In other implementations, the determination of the weight distribution data 440 may be performed at least partially onboard the weight sensor 120(6) or an associated device such as a controller. In some implementations, the weight distribution data 440 may indicate a change in the weight distribution from a first time to a second time. The weight distribution data 440 may be expressed as a weight associated with one or more of the weight sensors 120(6). For example, the weight distribution data 440 for a configuration in which a rectangular shelf has a weight sensor 120(6) at each of the four corners may have weight distribution data 440 corresponding to each of the corners. In another example, data from weight sensors 120(6) may be combined, such as to provide a weight measured at a left side of the inventory location 114 and a weight measured at a right side of the inventory location 114. In some implementations, the inventory management module 324 may determine the weight distribution data 440. In other implementations, the determination of the weight distribution data 440 may be performed at least partially on board the weight sensor 120(6) or an associated device such as a controller. The weight distribution data 440 may provide data indicative of center-of-mass (COM) at a particular time. For example, the weight distribution data 440 may indicate a COM, change in the COM from a first time to a second time, and so forth.

A variety of techniques may be used to calculate the COM or center-of-gravity. The COM may be described as a point in space at which weighted position vectors relative to the point sum to zero. For example, the COM of a uniform sphere is a point in the center of the sphere. In another example, the COM of a toroid is a point in the center of the toroid. A variety of techniques may be used to calculate the COM. Consider a simple system having two masses m1 and m2, arranged along a single axis "x" at positions x1 and x2, respectively. The position of each mass is given as a distance "x" relative to an origin. The COM may be expressed by the equation:

$$x=((m1*x1)+(m2x2))/(m1+m2) \qquad \text{Equation 1}$$

The physical characteristics of the inventory location 114, placement of the weight sensors 120(6) at the inventory location 114, physical position of the partitioned area 134 relative to the inventory location 114, quantity and weight of the items 104 at the respective partitioned areas 134, and so forth, may be known. For example, given the physical design of the inventory location 114, it may be known that a weight sensor 120(6) is positioned at each of the four corners of a shelf, and that the shelf has a particular length and width. Continuing the example, the physical coordinates corresponding to the partitioned area 134 on that shelf are known. Using this information, as well as the item data 136, weight characteristic data 436 may be generated for an inventory location 114 before, during, or after an interaction.

The location of weight change (LWC) data 442 provides information indicative of the location, with respect to the inventory location 114, at which a weight change has taken place. For example, the LWC data 442 may indicate that a weight change has taken place at 15 cm from the origin of the inventory location 114. The LWC data 442 may be determined using the weight data 126. For example, the LWC data 442 may be calculated from the weight distribution data 440.

In some implementations, the LWC data 442 may be expressed as a vector value having a direction and a magnitude. For example, the LWC data 442 may comprise a vector having a first endpoint at an origin of the inventory location 114 and a second endpoint at the location of the weight change.

In one implementation, the LWC data 442 may be determined as follows. Assume a situation wherein the inventory location 114 comprises a shelf having a width "a", a left weight sensor located at a distance "b" from the left edge of the shelf and a right weight sensor located at a distance "b" from the right edge of the shelf. The weight measured by the left weight sensor is "w1" and the weight measured by the right weight sensor is "w2". A distance "LWC" indicative of the location of weight change from an origin at the leftmost edge of the shelf may be calculated to the center-of-mass of an individual item 104 that has been added or removed in an interaction using the following equation:

$$\text{LWC}=w2*(a-2b)/(w2+w1)+b \qquad \text{Equation 2}$$

The weight change corresponding to the interaction may be calculated as:

$$\text{Total weight change}=w1+w2 \qquad \text{Equation 3}$$

During operation, the weight data 126 may be "tared" or zeroed out while the load on the platform measured by the weight sensors 120(6) is in a stable state. Subsequent changes in the weight data 126 may be used to produce the weight distribution data 440. For example, the inventory location 114 when fully loaded may have a total weight of 15 kg. The processing module 328 may "tare" these values, such that the weight is read to be "0 kg". A subsequent interaction such as a removal of two items 104 may result in a total weight change of 910 grams, with a weight distribution of 850 g on the left and 55 g on the right. Given a shelf width "a" of 1 m and the distance "b" of 0.1 m, the LWC is at 0.148 meters from the origin at the leftmost edge of the shelf.

The processing module 328 or other modules may transform the weight characteristic data 436 from one form to another. For example, the LWC data 440 may be determined using the weight distribution data 440. Similarly, the LWC data 440 may be used to derive a COM.

The inventory management module 324 may be configured to generate activity data 336, based at least in part on non-weight data 128. The activity data 336 provides information indicative of an activity, or lack thereof, at the inventory location 114. The activity data 336 may include one or more of location data 444, motion data 446, duration data 448, user identifier 450, or other data 452. In some implementations, the activity data 336 may be generated at least in part using the intermediate data 334. For example, the motion data 446 may be generated using differential data 434 obtained from a plurality of images.

The location data 444 provides information indicative of a particular position or partitioned area 134 that the activity is associated with. For example, a shadow 132 detected by an optical sensor array 120(13) beneath the partitioned area 134(1) may be processed to generate location data 444 indicative of the partitioned area 134(1). In some implementations, the location data 444 may be generated based on the physical configuration data of the facility 102. For example, given a known placement of the camera 120(1) above the partitioned area 134, and the FOV 130 of that camera 120(1) being directed toward the partitioned area 134, the image data 422 obtained from the camera 120(1) is associated with that particular location.

The motion data 446 may comprise information indicative of motion of one or more objects within the facility 102, particularly with regard to the inventory location 114, partitioned area 134, or other particular area. For example, the motion data 446 may indicate that an object is approaching the inventory location 114. In one implementation, the motion data 446 may be determined at least in part by the image data 422 acquired by one or more of the cameras 120(1).

The duration data 448 provides information indicative of the duration of an activity. For example, the duration data 448 may provide information about how long the hand of the user 116 remained within the FOV 130 in the image data 422.

The user identifier 450 provides information indicative of a particular user 116. For example, the user identifier 450 may comprise an account number, account name, key value, serial number, and so forth, associated with a particular user 116 or user account. The processing module 328 may be configured to determine the user identifier 450. For example, the processing module 328 may use facial recognition techniques such as available in OpenCV, Itseez, OKAO, and so forth as described above to recognize a particular user 116 and associate the corresponding user identifier 450 with that user 116.

The processing module 328 may generate interaction data 342 using the intermediate data 334, activity data 336, and so forth. The interaction data 342 may comprise one or more of an interaction type 454, a partition identifier 414, an item identifier 402, a quantity change 456, and so forth. For example, differential data 434 such as the location of pixels 424 in a differential image produced from image data 422 may be used to determine a hand of the user 116 is moving in an area corresponding to the partitioned area 134.

The interaction type 454 may provide information about whether the interaction is determined to be a pick, place, touch, pick and place, and so forth. The processing module 328 may use the intermediate data 334 or other information such as the sensor data 124, the activity data 336, and so forth, to determine the interaction type 454. For example, weight characteristic data 436 may be generated from the weight data 126. Based on activity data 336 indicative of motion at the inventory location 114, the processing module 328 may determine that the weight data 126 is reliable and uses non-weight data 128 to disambiguate between several hypotheses corresponding to the weight characteristic data 436.

The partition identifier 414 may indicate the particular partition data 330 corresponding to the partitioned area 134 associated with the hand of the user 116. Using the partition identifier 414, the item identifier 402 may be determined.

For example, a particular portion of the FOV 130 may be associated with a particular partitioned area 134 and the item 104 stowed thereby.

The item identifier 402 specifies the item 104 implicated by the interaction. For example, the item identifier 402 may indicate the item 104 that was picked, placed, touched, and so forth. In some implementations, the item identifier 402 may be determined at least in part by the weight data 126. For example, as described above, based on one or more of the weight characteristic data 436, the particular item 104 may be identified, the quantity change of the items 104 at the inventory location 114 resulting from the interaction may be determined, and so forth.

The quantity change 456 provides information indicative of a change in the quantity of the item 104 resulting from the interaction. For example, the quantity change 456 may indicate a value of "−1" when a single item 104 is picked from the inventory location 114, or a value of "+3" when three items 104 are placed to the inventory location 114.

The item data 136 may provide information about an individual item 104, while the interaction data 342 may comprise information about one or more of the items 104 that may be undergoing some change, such as movement from the inventory location 114 to the tote 118.

In one implementation, the processing module 328 may generate other information about the items 104 stowed at the inventory location 114. For example, the interaction data 342 may be analyzed to determine if a user 116 such as a person tasked with restocking the inventory location 114 is rotating stock such that old stock is brought to the front while new stock is placed behind.

In another implementation, the processing module 328 may generate information indicating that an item 104 has been misplaced in an incorrect partitioned area 134. For example, the weight characteristic data 436 may be compared to item weight data 404. Based on a mismatch between the weight characteristic data 436 and the item weight data 404, it may be determined an item 104 has been stowed in the wrong partitioned area 134.

Figure 5:
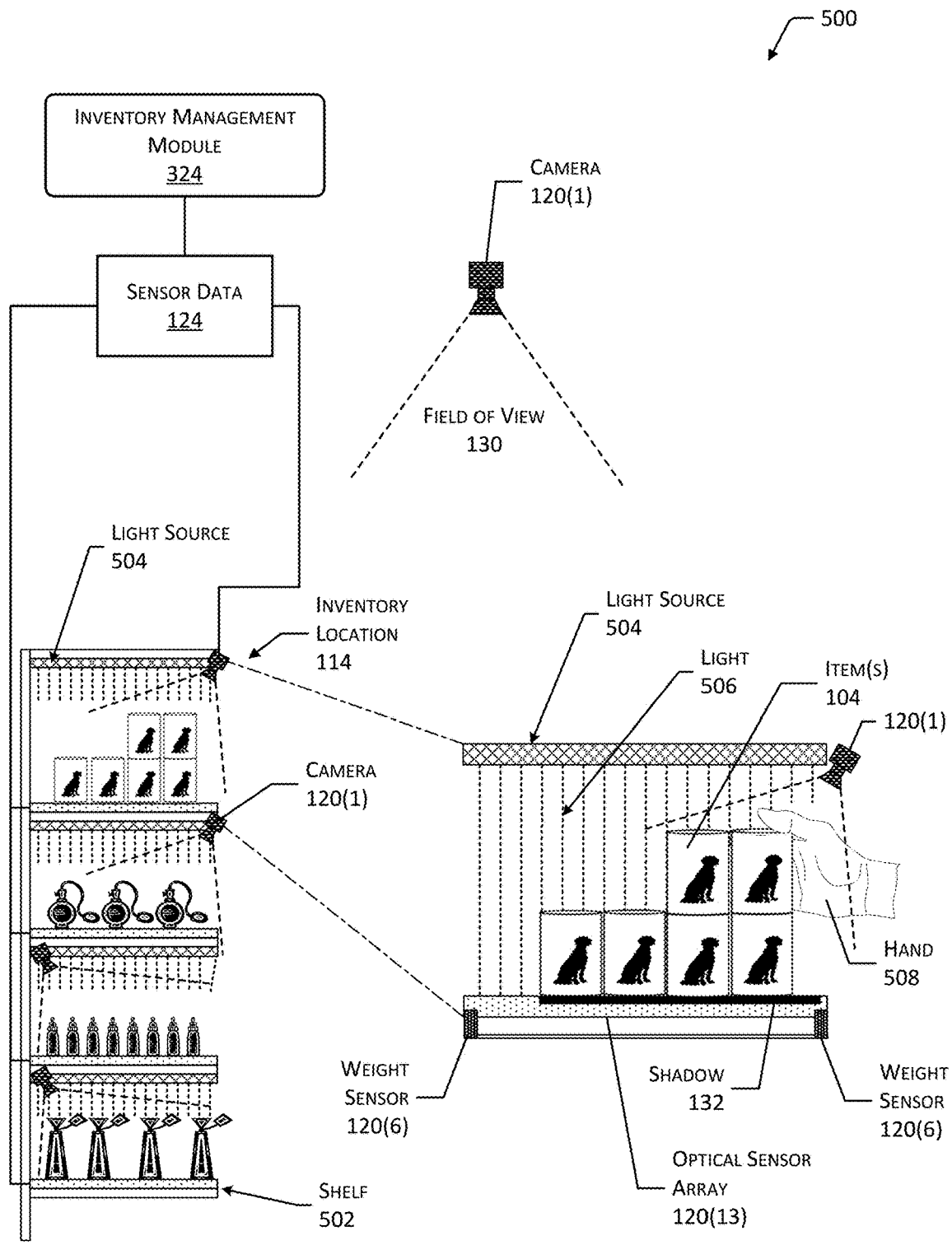
FIG. 5 illustrates a side view of an inventory location that includes various sensors, according to some implementations.

FIG. 5 illustrates a side view 500 of an inventory location 114 that includes various sensors 120, according to some implementations. In this illustration, the inventory location 114 comprises a shelf 502 on a rack.

One or more weight sensors 120(6) may be used to obtain weight data 126 from a platform, such as the shelf 502. In this illustration, the weight sensors 120(6) are arranged at the corners of the shelf 502. In another implementation, the weight sensors 120(6) may be mounted on attachment points that affix the shelf 502 to the rack. For example, the bracket supporting the shelf 502 may include a strain gauge configured for use as a weight sensor 120(6).

Above the shelf 502 may be a light source 504 configured to emit light 506. The light source 504 may comprise one or more LEDs, quantum dots, electroluminescent devices, incandescent lamps, fluorescent lamps, and so forth. The light source 504 may be configured to emit light 506 in one or more wavelengths including, but not limited to, infrared, visible, or ultraviolet. In some implementations, to reduce dazzling the eyes of the user 116, the light source 504 may be configured to emit infrared light 506.

The light source 504 emits light 506 that is detectable by at least a portion of the optical sensors 120(7) in the optical sensor array 120(13). In some implementations, the light source 504 may be located elsewhere with respect to the optical sensor array 120(13). For example, the light source 504 may comprise an overhead light fixture that provides general illumination to the inventory location 114.

The shelf 502 may incorporate the optical sensor array 120(13) as illustrated in FIG. 5. For example, the shelf 502 may comprise a structure such as a piece of glass or plastic that is transparent to the wavelengths of light 506. The items 104 may rest upon the structure, as illustrated here, or may hang above the structure, such as from a peg or arm. In some implementations, items 104 may be stacked one atop another, such as shown here with stacked cans of pet food.

As a result of the light 506 impinging upon the item 104, a shadow 132 is cast upon at least a portion of the optical sensor array 120(13). The intensity of light within the shadow 132 may be dependent upon the transparency of the item 104. For example, a clear glass bottle holding water may cast a light shadow 132, while an opaque black plastic bottle may cast a very dark shadow 132. During an interaction, the shadow 132 may also be cast, at least in part, by another object such as a hand 508 of the user 116.

The optical sensor array 120(13) is configured to provide image data 422 to the inventory management module 324. The image data 422 may then be processed by the processing module 328 to generate the interaction data 342, such as which of the partitioned areas 134 held the item 104 the user 116 interacted with.

The light source 504 may be configurable to modulate the light 506. The light 506 may be modulated such that the optical sensor array 120(13) is able to filter out or disregard other light sources 504 and obtain image data 422 based on the light 506 coming from the known position of the light source 504. Modulation of light 506 may include, but is not limited to, carrier modulation, amplitude shift keying, pulse position modulation, Manchester encoding, and so forth. The optical sensor array 120(13) may be configured to process the data from the optical sensors 120(7) to generate light intensity values 426 for the light 506 having the predetermined modulation. For example, data values associated with non-modulated light may be disregarded or filtered out.

In another implementation, operation of the light source 504 and the optical sensor array 120(13) may be time synchronized. For example, the light source 504 may be configured to emit light 506 at a particular time and for a particular duration, such as 50 ms. The optical sensor array 120(13) may be configured to acquire data from the optical sensors 120(7) while the light source 504 is emitting light 506. In some implementations, first image data 422(1) acquired while the light source 504 is active may be compared with second image data 422(2) acquired while the light source 504 is inactive. A comparison may be made between the first image data 422(1) and the second image data 422(2) to filter out or otherwise calibrate the system for ambient light.

In still another implementation, the light source 504 may be included in the optical sensor array 120(13). For example, the light sources 504 may comprise LEDs that are configured to emit light 506 toward where the item 104 may be stowed. The light 506 may be reflected from an object such as the hand 508, the item 104, and so forth. The reflected light may be detected by one or more of the optical sensors 120(7). In some implementations, the light 506 may be distributed from the light source 504 using an optical waveguide, fiber optic fibers, or other features.

In yet another implementation, the optical sensor array 120(13) may comprise a plurality of proximity sensors 120(14). The proximity sensors 120(14) may use data indicative of proximity of an object such as the item 104 to generate the image data 422. For example, an array of capacitive proximity sensors 120(14) may be used to generate the image data 422.

One or more cameras 120(1) may also be positioned at one or more of on, in, or around the inventory location 114. For example, cameras 120(1) may be arranged such that their FOV 130 looks on a shelf 502. The cameras 120(1) may be arranged at a front edge of the inventory location 114 such as closest to the aisle 112 during operation, at the back edge of the inventory location 114, both at the front and back edges of the inventory location 114, overhead the inventory location 114, and so forth.

Figure 6:
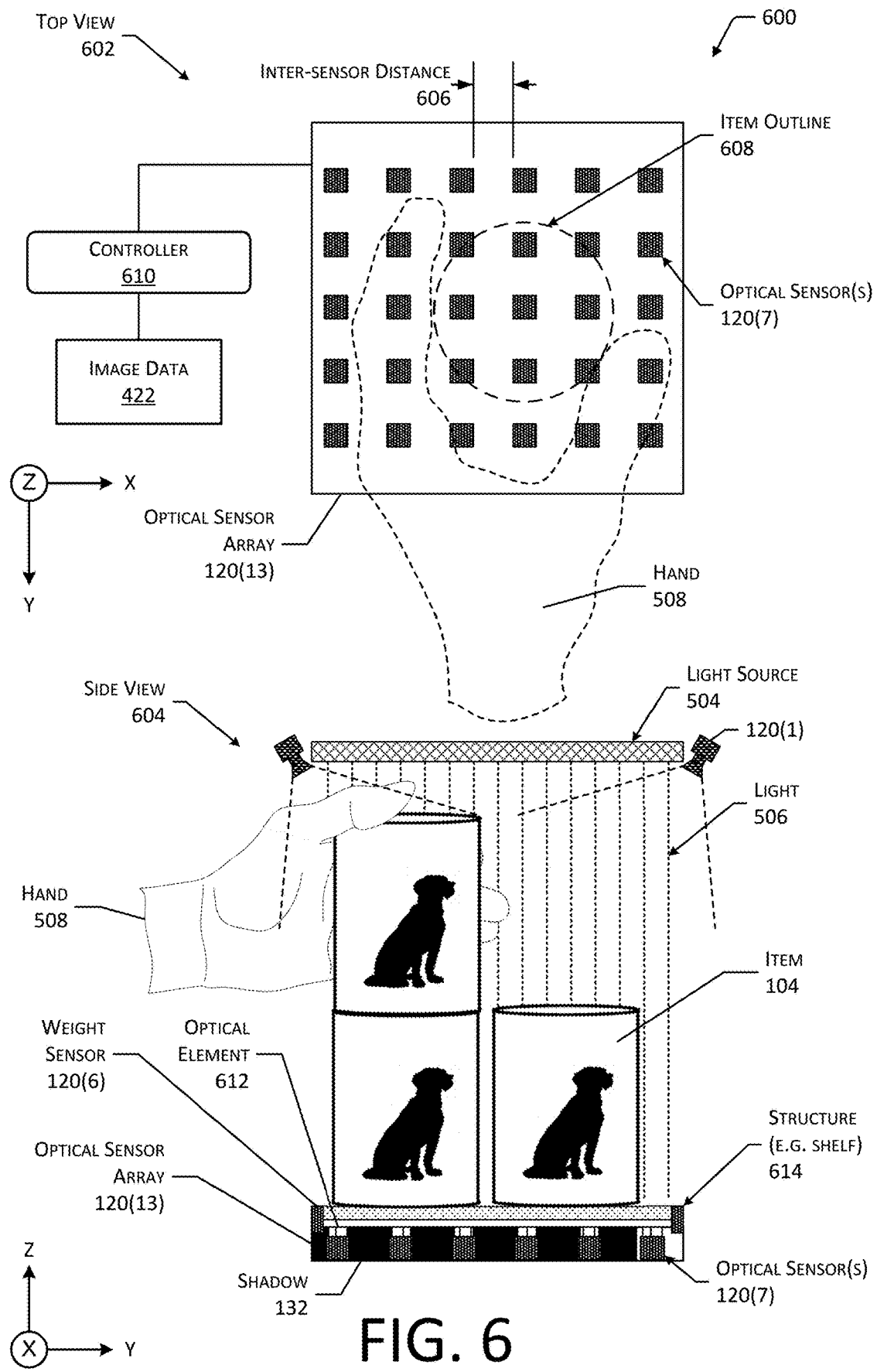
FIG. 6 illustrates enlarged top and side views of a portion of the inventory location, according to some implementations.

FIG. 6 is an illustration 600 of the optical sensor array 120(13), according to some implementations. In this illustration, a top view 602 and a side view 604 are presented.

As shown by the top view 602, the optical sensor array 120(13) may comprise a plurality of optical sensors 120(7). The optical sensors 120(7) may be arranged in a two-dimensional arrangement, such as the grid arrangement depicted here. The arrangement shown here comprises an array with an inter-sensor distance 606 that is approximately the same as measured along the X and Y axes. For example, the inter-sensor distance 606 may be at least 5 millimeters (mm) between the centers or the edges of the optical sensors 120(7). In some implementations, such as described below with regard to FIG. 8, the inter-sensor distance 606 may be representative of a distance between optical elements 612.

In other implementations, other arrangements of the optical sensors 120(7) may be used. For example, the arrangement may comprise a triangular space filling array with an optical sensor 120(7) located at each vertex.

The distribution or arrangement of the optical sensors 120(7) may be asymmetrical. In one implementation, the inter-sensor distance 606 may be varied. For example, a central region of the optical sensor array 120(13) may be sparsely populated with optical sensors 120(7) such that the inter-sensor distance 606 along the X and Y axes is greater than side regions flanking the central region. Within the side regions, the inter-sensor distance 606 may be lesser than that within the central region where the optical sensors 120(7) are sparsely populated.

For illustrative purposes, an item outline 608 of an item 104 and an outline of the hand 508 are depicted in the top view 602. The item outline 608 and corresponding shadow 132 that includes the footprint or shadow of the item 104 and the hand 508 are discussed in more detail below.

A controller 610 may be coupled to the optical sensors 120(7) of the optical sensor array 120(13). The controller 610 may comprise a microcontroller or other device configured to read out or otherwise acquire information from the optical sensors 120(7). The controller 610 may be configured to use the input from the optical sensors 120(7) to generate the image data 422. In some implementations, the controller 610 may provide the image data 422, such as a bitmap to another device such as the server 204.

The side view 604 depicts additional components of the optical sensor array 120(13). In some implementations, the optical sensors 120(7) may be optically coupled to one or more optical element 612 devices. The optical elements 612 may comprise optical waveguides, optical fibers, mirrors, lenses, or other devices configured to direct, focus, control, or distribute at least a portion of incident light 506 to one or more of the optical sensors 120(7). The optical elements 612 may be arranged in a two-dimensional arrangement, while the optical sensors 120(7) may be otherwise arranged. For example, in one implementation, the optical sensors 120(7) may be located along an edge of the optical sensor array 120(13), and the optical elements 612 may comprise optical fibers mounted and configured as an array to gather the light 506 and direct the light 506 to the optical sensors 120(7).

In some implementations, a structure 614 may provide physical support for an item 104, may protect the optical sensor array 120(13) from damage, and so forth. The structure 614 may comprise a material transmissive to the wavelengths of light 506 that are detectable by the optical sensors 120(7). For example, the structure 614 may comprise glass or plastic that is transparent or translucent. In some implementations, the structure 614 may comprise a mesh or a material with holes through which light 506 may pass.

In the implementation depicted here, the items 104 rest upon the structure 614. In other implementations, the items 104 may be supported or suspended from above the structure 614, such as from support pegs or bars. The shadow 132 may comprise the shadow 132 cast by the hanging items 104. For example, the items 104 may be hanging from a peg or a hook.

In the implementation depicted here, the optical sensor array 120(13) is located below the item 104. The optical sensors 120(7) detect light 506 from above the structure 614, such as passing through the shelf. In other implementations, the optical sensor array 120(13) may be located in other positions relative to the item 104, such as above or behind. For example, the light source 504 and the optical sensor array 120(13) depicted in FIG. 6 may be transposed, such that the light 506 beneath the structure 614 is emitted and directed upward toward the optical sensor array 120(13). The shadow 132 may then be cast by the objects between the light source 504 that is below onto the optical sensor array 120(13) that is above. In another example, the optical sensor array 120(13) may be arranged vertically, such as to the rear or one side of the partitioned area 134, to gather data about height of items 104.

One or more weight sensors 120(6) are configured to determine the weight of the load on the structure 614. For example, the weight sensors 120(6) may provide a physical coupling between the structure 614 and another portion of the inventory location 114, such as a support rib or frame. The weight sensors 120(6) may be arranged at various positions, such as proximate to the four corners of the structure 614.

Also depicted are cameras 120(1) configured to generate non-weight data 128 such as image data 422. The FOV 130 of the cameras 120(1) are configured to include at least a portion of the inventory location 114. For example, the cameras 120(1) may be mounted above the shelf 502 and configured with the FOV 130 looking down on to the shelf 502.

Figure 7:
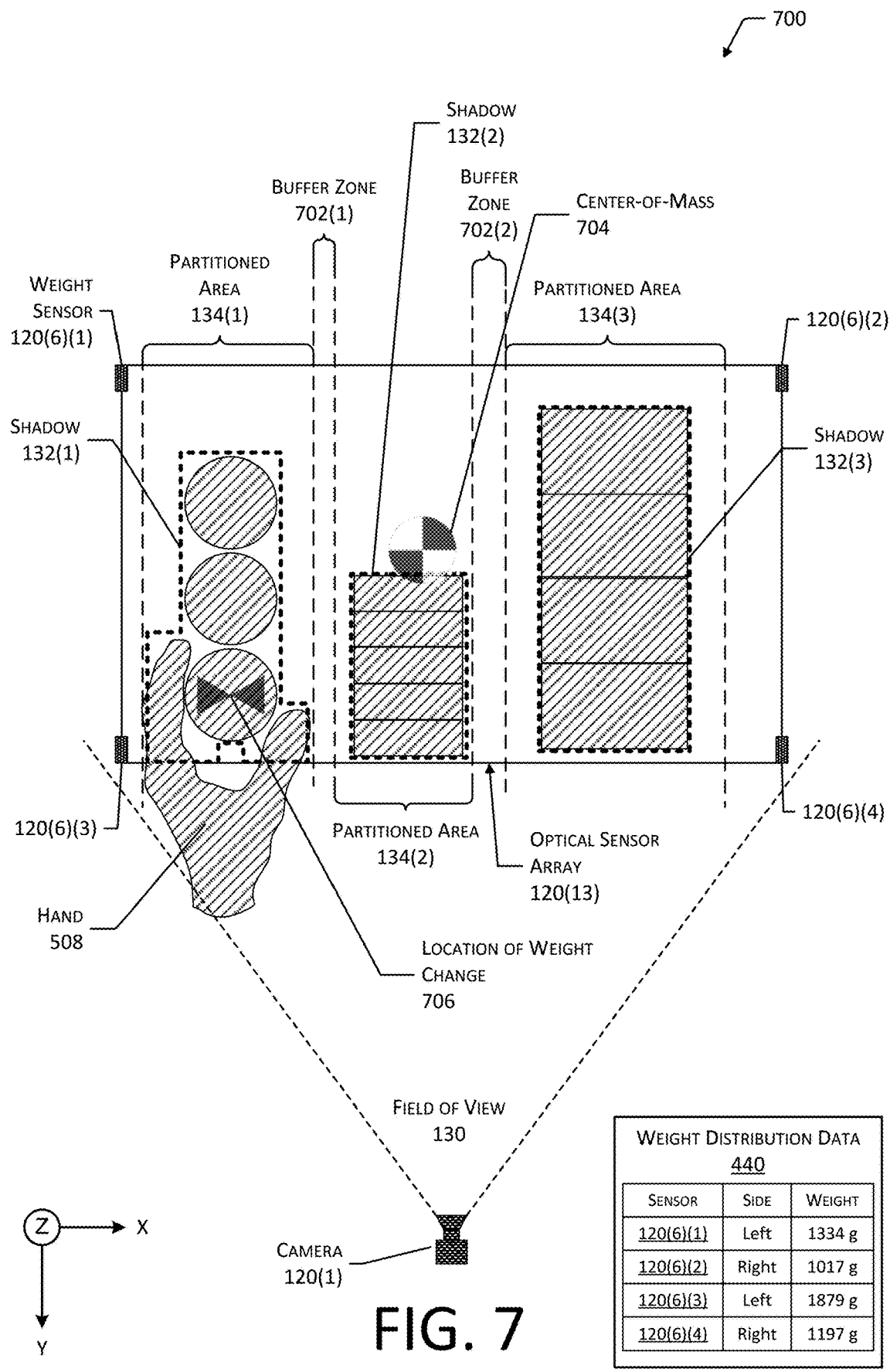
FIG. 7 illustrates an overhead view of partitioned areas at the inventory location, the shadows of objects on the partitioned area, and a weight distribution of the inventory location, according to some implementations.

FIG. 7 illustrates an overhead view 700 of partitioned areas 134 at the inventory location 114, the shadows 132 of objects on the partitioned area 134, and weight distribution of the inventory location 114, according to some implementations.

As described above, a single inventory location 114 may be used to stow different items 104. The inventory location 114 may be partitioned into a plurality of partitioned areas 134. The inventory location 114 in this illustration is partitioned into a first partitioned area 134(1), a second partitioned area 134(2), and a third partitioned area 134(3). A buffer zone 702 may be provided to improve distinction between the partitioned areas 134.

As described above, partition data 330 may designate a particular portion or area of the inventory location 114 as being associated with a particular partitioned area 134. For example, the partition data 330 may describe the size and the shape of the partitioned areas 134, the position of the partitioned areas 134 with respect to the inventory location 114, and so forth.

In some implementations, the inventory location 114 may be serviced by one or more optical sensor arrays 120(13). During operation, the optical sensor array 120(13) produces image data 422. The inventory management module 324 may process the image data 422 to determine the presence of one or more shadows 132. As the user 116 reaches for an item 104 stowed at the inventory location 114 in one of the partitioned areas 134, their hand 508 casts an additional shadow 132 onto the optical sensor array 120(13). For example, as depicted here the hand 508 of the user 116 is reaching to grasp one of the items 104 stowed at the first partitioned area 134(1). As a result, a shadow 132(1) comprising the rectangular shadow 132 cast by the items 104 and the hand 508 is formed. Based on this change in the shadow 132(1), interaction data 342 may be generated that indicates an interaction is occurring at the partitioned area 134(1). Using the partition data 330, the partitioned area 134(1) may be associated with the item identifier 402 of the item 104 stowed therein.

During some interactions, the shadow 132 before and after an interaction may not change. For example, as the user 116 removes an item 104 from a top of a stack, such as an uppermost can of pet food, the shadow 132 cast by the remaining cans sitting on the shelf remains unchanged. However, the processing module 328 may be configured to detect the shadow 132 cast by the hand 508, the item 104 as it is removed, and so forth.

In other interactions, the removal of an item 104 may provide additional information to the processing module 328 that may be used to determine occurrence of an interaction. For example, first image data 422(1) may show a rectangle with an area of 12 pixels while second image data 422(2) acquired at a later time may indicate that the rectangle is now smaller with an area of 8 pixels. As a result, the interaction data 342 may indicate an interaction type 454 of a "pick". Likewise, an increase in the area of the shadow 132 may indicate an interaction type 454 of a "place", as a newly placed item 104 blocks at least some of the light 506.

In another implementation, the optical sensor array 120(13) may be mounted to gather data about a shadow 132 of a stack of items 104. For example, the optical sensor array 120(13) may be located on a side wall or partition separating the partitioned area 134(1) from 134(2) while the corresponding light source 504 may be arranged on the opposite side of the partitioned area 134.

Similar techniques may be used to process other image data 422, such as obtained from one or more cameras 120(1) having a FOV 130 that includes at least a portion of the inventory location 114. For example, a transformation matrix may specify a correspondence between the location of the pixels 424 in the image data 422 and the position of the partitioned area 134 on the inventory location 114. As a result, the presence of motion of an object in the image, such as a hand 508, may be determined and associated with a particular inventory location 114, partitioned area 134, or other location.

In some implementations, the processing module 328 may calculate quantity data 412 for a particular partitioned area 134. In one implementation, the calculation may use information based on the image data 422. For example, the area of a shadow 132 in the image data 422 obtained from an optical sensor array 120(13) while in a stable state (such as when no hand 508 is present) may be divided by previously stored geometry data 406 such as the area of the shadow 132 of an individual item 104, and rounding the resulting value to a nearest integer value. The integer value may then be used as the quantity data 412.

In other implementations, the processing module 328 may calculate quantity data 412 for a particular partitioned area 134 using the weight data 126. This calculation is described below in more detail.

A plurality of optical sensor arrays 120(13) may be used in conjunction with the same inventory location 114, partitioned area 134, and so forth. For example, two or more optical sensor arrays 120(13) mounted perpendicular to one another may be used to generate two sets of non-weight data 128 about the shadow of items 104. Based at least in part on the shadow 132 as expressed by the non-weight data 128, a volume occupied by objects such as the items 104, the hand 508, and so forth, may be determined. The non-weight data 128 may also be used to generate interaction data 342, to determine quantity data 412, and so forth.

As described above, the inventory location 114 may have one or more weight sensors 120(6) to generate weight data 126 about a load. For example, as depicted here, weight sensors 120(6)(1) through 120(6)(4) are arranged at each of the four corners of an inventory location 114 comprising a shelf 502. The weight sensors 120(6)(1) and 120(6)(3) are on a left side of the inventory location 114, while weight sensors 120(6)(2) and 120(6)(4) are on a right side. In other implementations, the weight sensors 120(6) may be placed at other locations on or relative to the inventory location 114. The load may include a portion of the shelf 502, other structures such as partitions, as well as the items 104.

Each item 104 has inherent physical properties such as a weight, individual center-of-mass, height, width, depth, shape, and so forth. A group or collection of items 104 that are supported by or part of a common structure have a combined weight distribution across a plurality of weight sensors 120(6). An illustration of weight distribution data 440 is depicted in a table that further indicates the side of the inventory location 114 that the weight sensor 120(6) is located on.

Individual objects have their own inherent center-of-mass (COM). Groups of items 104, such as the entire inventory location 114 and the objects stowed therein also have a COM. Depicted in this figure is an indicia of a center-of-mass (COM) 704 for the entire inventory location 114 including the items 104 stowed thereby, hardware on the shelf, and so forth. In this illustration, the COM 704 is located within the second partitioned area 134(2). As illustrated with regard to FIG. 8, a change in the quantity or the arrangement of the items 104 may result in a change in weight distribution and the COM 704.

The COM 704 may be expressed in terms of coordinates with respect to an origin. In some implementations, the COM 704 may be determined along a single dimension, such as the width of the inventory location 114 represented by the X axis in this figure. In this implementation, the values from the weight data 126 obtained from the weight sensors 120(6) located on the left side may be summed together to provide a single "left" weight data 126, while the values from the weight data 126 obtained from the weight sensors 120(6) located on the right side may be summed together to provide a single "right" weight data 126. The COM 704 for the inventory location 114 may thus be determined using the "left" weight data 126 and the "right" weight data 126, with the position of the COM 704 expressed as a linear measurement.

Also depicted is a location of weight (LWC) change 706. The LWC 706 in this illustration corresponds to the position, with respect to the inventory location 114, of the COM of the particular item 104 that the hand 508 is removing. The LWC 706 may be determined as described above with regard to FIG. 4, in particular Equation 2.

The weight data 126 may be used to generate interaction data 342. In some implementations, the non-weight data 128 may be used to select a hypothesis that has been determined based on the weight characteristic data 436. For example, the image data 422 obtained from the camera 120(1) or from the optical sensor array 120(13) may be used to determine activity data 336. The activity data 336 may be used to select or discard hypotheses based on whether activity has been detected at a particular partitioned area 134 or inventory location 114. The selected hypothesis is designated as a solution, and the values of the variables of the solution may be used to generate the interaction data 342. For example, the solution may be a hypothesis that specifies a quantity of 2 of item 104(1) was removed from the partitioned area 134(1). The interaction data 342 may be generated that indicates a quantity of 2 of item 104(1) was removed from the partitioned area 134(1).

Figure 8:
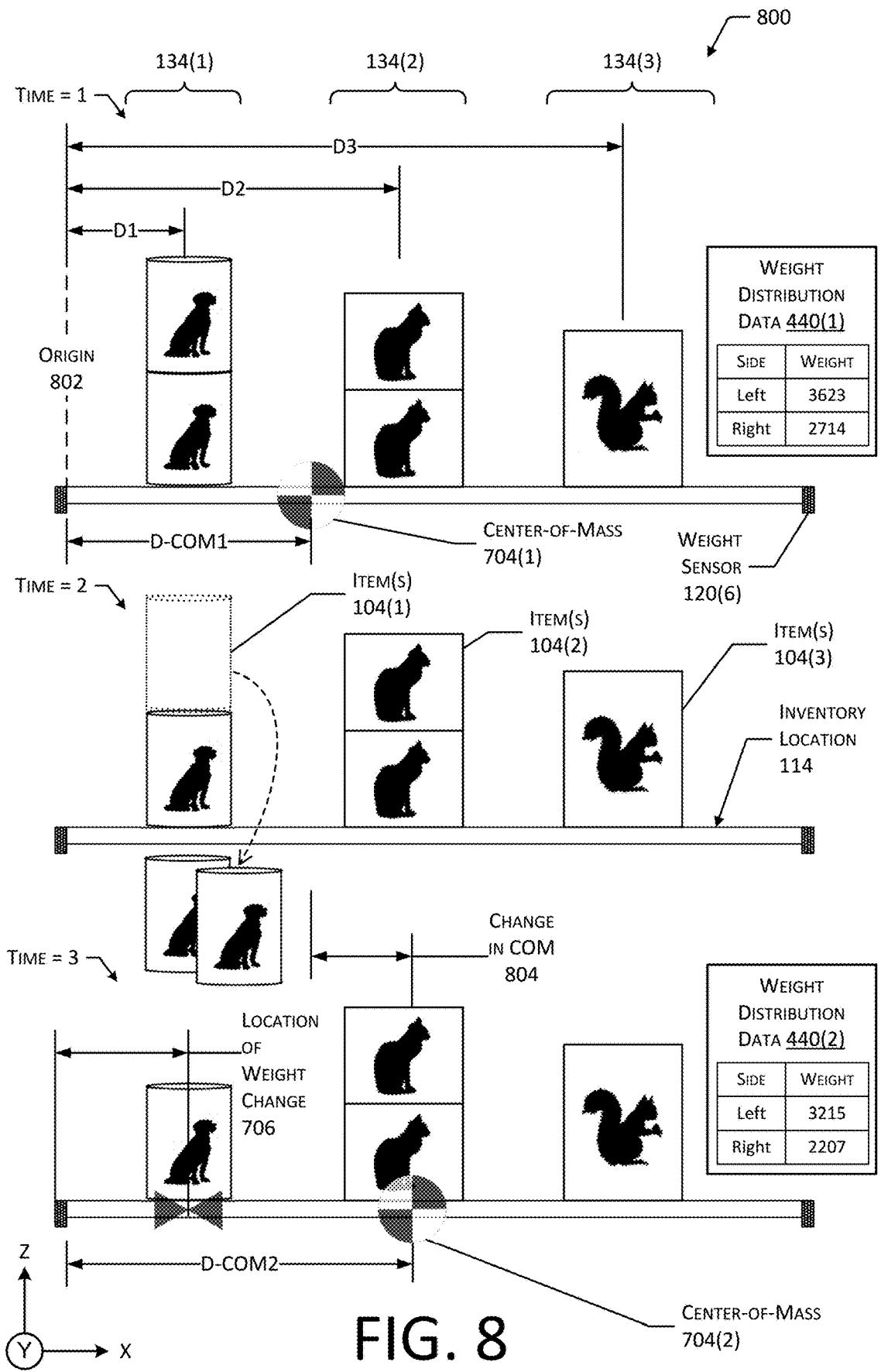
FIG. 8 illustrates a front view of the inventory location before and after removal of an item from the inventory location, according to some implementations.

FIG. 8 illustrates a front view 800 of an inventory location 114 before and after removal of an item 104 from the inventory location 114, according to some implementations.

In this illustration, a front view is provided for three different times, time=1 before an interaction, time=2 during the interaction, and time=3 after the interaction. An origin 802 is designated at the left-most edge of the inventory location 114. At the left and right edges of the inventory location 114 are weight sensors 120(6).

Depicted here are the three partitioned areas 134(1), 134(2), and 134(3) in which items 104(1), 104(2), and 104(3), respectively are arranged in the lanes. Distances from the origin 802 to the center of each of the items 104 are indicated. For example, distance D1 indicates a distance from the origin 802 to the item 104(1), distance D2 indicates a distance from the origin 802 to the item 104(2), and distance D3 indicates a distance from the origin 802 to the item 104(3).

Based on the item data 136 indicative of the quantity of each item 104, the total weight of items 104 in each of the partitioned areas 134 may be calculated. Using the total weight at each partitioned area 134 and the distance data to the respective items 104, a distance to the first COM 704(1) (D-COM1) may be calculated.

At time=1, first weight data 126(1) is obtained from the weight sensors 120(6) and used to determine D-COM1. A first weight distribution data 440(1) may be generated from the first weight data 126(1).

At time=2, a quantity of 2 of item 104(1) has been removed from the partitioned area 134(1), such as resulting from a pick by the user 116.

At time=3, after the interaction has completed, second weight data 126(2) is obtained from the weight sensors 120(6) and used to determine distance to the second COM 704(2) (D-COM2). A second weight distribution data 440(2) may be generated from the second weight data 126(2).

Location of weight change (LWC) data 442 may be generated. For example, a difference between the first weight distribution data 440(1) and the second weight distribution data 440(2) may be used to determine the LWC 706 as depicted here. Continuing the example, the difference between the weight distribution data may be used as input to Equation 2 described above.

A change in COM 804 may be determined by subtracting D-COM2 from D-COM1, or vice versa. The direction of the change in position of the COM 704 along the inventory location 114 relative to the origin 802 may be indicated by the sign of the difference. For example, a change in COM 804 having a positive sign may be indicative of a shift in the COM 704 to the left, while a negative sign may be indicative of a shift in the COM 704 to the right. The weight characteristic data 436 may include one or more of the position of the COM 704 (such as the value of the distance to the COM 704), change in COM 804 (both magnitude and direction), and so forth. Similarly, a change in weight distribution may be determined by subtracting the second weight distribution data 440(2) from the first weight distribution data 440(1).

The weight distribution data 440, location of the COM 704 relative to the inventory location 114, the LWC 706, the change in COM 804, or other weight characteristic data 436 may be used by the processing module 328 to determine interaction data 342 by selecting or discarding various hypotheses. For example, the change in weight of the inventory location 114 and the LWC 706 may be indicative of the removal of two items 104(1) from the partitioned area 134(1). The LWC 706 may be used to associate an interaction with a particular partitioned area 134 at the inventory location 114.

As described above, various predicted changes in quantity may be used to generate hypotheses data 340. The hypotheses data 340 may comprise different combinations of quantities of items 104, their respective placement within partitioned areas 134, and so forth. By comparing the measured weight characteristic data 436 with the predicted weight characteristic data 436 in the hypotheses data 340, the interaction data 342 may be determined by the inventory management system 122.

Illustrative Processes

Figure 9:
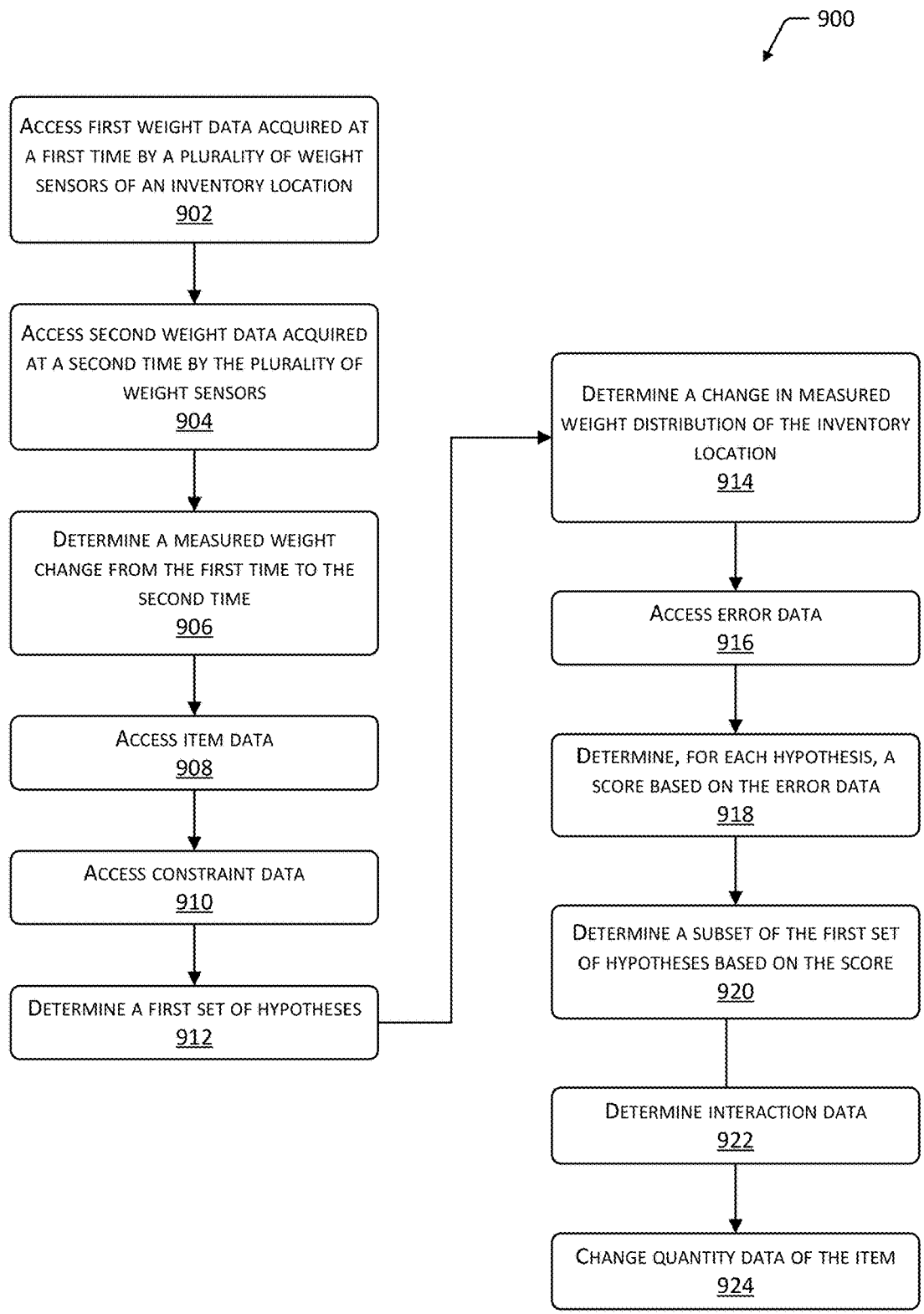
FIG. 9 depicts a flow diagram of a process for determining an interaction with a particular inventory location or portion thereof, based on weight data, according to some implementations.

FIG. 9 depicts a flow diagram 900 of a process for determining an interaction with a particular inventory location 114 or portion thereof, based on weight data 126, according to some implementations. The process may be implemented at least in part by the inventory management module 324. In different implementations, one or more of the blocks described below may be omitted, the sequence of the process using these blocks may vary from that depicted, and so forth.

Block 902 accesses first weight data 126(1) acquired by the plurality of weight sensors 120(6) at a first time. For example, the weight data 126 may be obtained from a controller coupled to one or more of the weight sensors 120(6) and stored in the memory 316. The weight sensors 120(6) may be coupled to the inventory location 114 and configured to provide weight data 126 indicative of a load at the inventory location 114. The weight data 126 may be indicative of a weight at a particular weight sensor 120(6), or a sum of two or more weights from a group of weight sensors 120(6). For example, the weight data 126 may provide weights for each of the weight sensors 120(6), or may comprise summed weights from the weight sensors 120(6) on the left and right, respectively.

Block 904 accesses second weight data 126(2) acquired by the plurality of weight sensors 120(6) at a second time. For example, the second time may be a time determined to be a stable state, such as when the weight data 126 is determined to be relatively constant, after a threshold period of time, based on non-weight data 128, and so forth.

Block 906 determines a measured weight change based on a difference between the first weight data 126(1) at the first time and the second weight data 126(2) at the second time. To determine the difference, the first weight data 126(1) may be subtracted from the second weight data 126(2), or vice versa.

Block 908 accesses item data 136. For example, the item data 136 may be indicative of weight of an individual type of item 104, weight of the combined items 104 stowed at the inventory location 114, information indicative of placement of the type of items 104 at the inventory location 114 (e.g., data indicative of a partitioned area 134), and so forth. For example, the item data 136 may comprise data indicative of a weight of the first item 104(1), a weight of the second item 104(2), and so forth.

The item data 136 may include other information such as weight variance data. For example, the weight variance data may specify a range within which the weight of an individual item 104 may be expected to be.

Block 910 accesses constraint data. The constraint data may be indicative of one or more of a minimum quantity of items 104 or a maximum quantity of items 104 assumed to be added to or removed from the inventory location 114 during an interaction. For example, the constraint data may specify that the maximum number or quantity of items 104(1) that may be stowed at the inventory location 114(1) is a maximum of 20 cans. Based on this, a constraint is specified in which no more than 20 cans of the type of item 104(1) may be removed from the inventory location 114 (such as when the shelf is fully stocked) or may be placed to the inventory location 114 (such as when the shelf is empty of that type of item 104(1)). The hypotheses having predicted values that exceed these constraints may be disregarded or otherwise omitted from further consideration.

Block 912 determines a first set of hypotheses. The one or more hypotheses in this set are descriptive of different interactions that may take place with regard to the inventory location 114. In some implementations, the hypotheses may be specific to a particular inventory location 114 and the layout of items 104 therein. For example, the first set of hypotheses may be specific to the particular configuration of items 104(1), 104(2), and 104(3) that are stowed in the inventory location 114(1). A different inventory location 114 may have a different set of hypotheses.

The hypotheses in the first set of hypotheses may include various predicted values. These predicted values may be generated within the constraints described above, or those hypotheses having predicted values outside of the constraints may be disregarded. Continuing the example above, the predicted changes in item quantity may be constrained to a maximum pick of 20 of item 104(1) and a maximum place of 20 of item 104(1). A predicted quantity for a type of item 104 may comprise information indicative of the total number of that type of item 104 at the inventory location 114 in that predicted scenario. For example, the hypotheses in the first set may include a first predicted quantity of the first item 104(1), a second predicted quantity of the second item 104(2), and a predicted weight change based on the first predicted quantity and the second predicted quantity and given the weight of an individual item 104. The hypotheses in the first set may be limited to those for which the predicted weight change is within a first threshold value of the measured weight change. The threshold data 332 may specify a threshold tolerance or allowable variation for the weight characteristic data 436, the comparison between the measured and predicted values, and so forth. For example, the threshold data 332 may specify a threshold tolerance of 5%. The hypotheses with a predicted weight change that is within 5% above or below the measured weight change may be retained in the first set, while other hypotheses that are outside of the threshold tolerance may be discarded or disregarded. In one implementation a difference between the predicted weight change and the measured weight change may be less than a threshold value. The threshold value may be expressed as an absolute value, signed value, and so forth. In other implementations the threshold may be compared to a ratio, and so forth. The hypotheses that exceed or otherwise do not satisfy the thresholds may be disregarded from consideration as a potential solution.

The hypotheses may also include predicted weight distribution data 440 of the inventory location 114 based on the predicted quantities of types of items 104 predicted to be stowed therein. For example, the weight distribution may be based on stowage of the first predicted quantity of the first item 104(1) and the second predicted quantity of the second item 104(2) at the inventory location 114.

The hypotheses may also include data about predicted changes in weight distribution. For example, the predicted changes in weight distribution indicate a predicted net change in the weight measured at the left weight sensors 120(6) and the right weight sensors 120(6), respectively. The net change may comprise a difference between a first predicted quantity and a second predicted quantity.

Block 914 determines a change in measured weight distribution of the inventory location 114. As described above, the weight data 126 obtained from the weight sensors 120(6)(1) and 120(6)(3) may be summed to produce left side weight of the inventory location 114, and the weight data 126 obtained from the weight sensors 120(6)(2) and 120(6)(4) may be summed to produce right side weight of the inventory location 114. The first weight distribution data 440(1) based on the first weight data 126(1) may be subtracted from the second weight distribution data 440(2) based on the second weight data 126(2) to determine the change in measured weight distribution. The change in measured weight distribution may be used to determine the LWC data 442 described above.

Block 916 accesses error data 338. The error data 338 may comprise a probability density function of weight sensor error as a function of weight measured. For example, the probability density function may indicate that for a measured weight of 50 g, an error of plus or minus 5 g has a probability of 0.90 of occurring. The probability of occurrence of a particular difference may be used to generate a score, as described below.

The error data 338 may, given a particular difference in weight, provide probability data indicative of a probability that the difference is the result of an error in the weight measurement. For example, the error data 338 may be used to determine that a variance of 3 g (between a predicted weight value and a measured weight value) may have a probability of 0.90 of occurring. In this example, the variance of 3 g would be an expected error that has a high probability of occurring. Continuing the example, given a variance of 500 grams between the predicted weight value and the measured weight value, the probability that this variance is the result of a sensor error as indicated by the error data 338 may be 1%. As a result, the variance of 500 grams due to an error in the weight sensor 120(6) has a low probability of occurring.

A block (not shown) may be used in some implementations to determine activity data 336. For example, the processing module 328 may be configured to determine that the differential data 434 is indicative of motion within the FOV 130, such as from a hand 508 at one or more of the partitioned areas 134, and generate motion data 446. In another example, the processing module 328 may recognize the appearance of a hand 508 in the image data 422 and generate corresponding activity data 336.

Block 918 determines, for one or more of the hypotheses in the first set of hypotheses, a score. In one implementation, the score may be based at least in part on a difference between the predicted change in weight distribution and the measured weight change distribution. For example, the predicted change in weight distribution may be subtracted from the measured weight change distribution to determine the difference. The score may comprise one or more of the absolute value, signed value, or percentage variance of the difference.

In another implementation, the score may be based at least in part on the error data 338. For example, each hypothesis may have a score based on the error data 338 associated with the respective predicted weights. In one implementation, a score may be determined for each of the hypotheses in the first set. The score may be based on one or more probabilities indicated in the error data 338 for one or more the following: a first difference between the predicted weight change and the measured weight change, or a second difference between the predicted change in weight distribution and the measured weight change distribution.

In one implementation, the score may comprise a product of probability values associated with constituents of a change in weight distribution. For example, the weight distribution may indicate a left weight and a right weight. Continuing the example, a left difference may indicate a difference between a left measured weight and a left predicted weight while a right difference indicates a difference between a right measured weight and a right predicted weight. A left probability indicative of a probability associated with the value of the left difference may be obtained from the error data 338 based on the left difference. Similarly, a right probability indicative of a probability associated with the value of the right difference may be obtained from the error data 338. The value of the left probability and the value of the right probability may be multiplied with one another to produce the score.

In some implementations, a normalized measurement error may be calculated for both sides of an inventory location 114. This normalization may take into account the predicted weight distribution (such as predicted left weight and predicted right weight) and the measured weight distribution (such as measured left weight and measured right weight). The normalized measurement error may be used as the input to determine the probability indicated by the error data 338.

Block 920 determines a subset of the first set of hypotheses. In some implementations, the subset may comprise a single hypothesis. The subset may be deemed to be a solution to the measured weight characteristics that have been observed. Determination of a single hypothesis from the first set of hypotheses may be based at least in part on scoring of the hypotheses. As described, a score for each of the hypotheses in the subset may be generated based on error data between predicted and measured weight characteristics, such as weight distribution.

Various techniques may be used to filter or otherwise select those hypotheses to include in the subset or exclude from the subset. In one example, the selection may be based on the score. For example, a subset may include the top n (where n is a non-zero integer) of the one or more hypotheses when sorted in descending order of score.

In another example, the subset may be selected to include those of the one or more of the hypotheses that have predicted weight distributions within a second threshold value of the measured weight distribution. Continuing the example, the second threshold value may specify a minimum and maximum variation that is determined to be acceptable for inclusion in the subset. In another example, the subset may include the top k (where k is a non-zero integer) of the one or more hypotheses when sorted in ascending order by variance between predicted weight change and measured weight change.

Occasionally, the first set of hypotheses may include several possible solutions that are within the threshold values of the measured weigh characteristics. To disambiguate between these the activity data 336 may be used in some implementations. For example, the item data 136 may indicate which partitioned areas 134 the respective types of items 104 are stowed in. Image data 422 may be obtained from a camera 120(1) and processed to determine activity data 336 about the one or more of the partitioned areas 134, such as presence of a hand 508. The activity data 336 may be used to disambiguate between the possible solutions. For example, a hypothesis that involves partitioned area 134(3) may be disregarded as a solution when the activity data 336 shows the user's 116 hand 508 at partitioned area 134(1).

In other implementations, the solution that includes a plurality of hypotheses may be provided to a human operator for disambiguation. For example, a human may compare the hypotheses to data acquired during the interaction and select the correct hypothesis, or generate a new hypothesis.

Block 922 determines interaction data 342 based on the solution determined by block 920. As described above, the interaction data 342 may be indicative of movement, with respect to the inventory location 114, of one or more items 104 in the quantities specified in the hypothesis of the subset that was designated as the solution.

Block 924 changes, using the interaction data 342, data indicative of a quantity of the types of items 104 in accordance with the solution. For example, the quantity data 412 for the item 104(1) may be updated to reflect that the number of items 104 at the inventory location 114 is now that specified by the solution.

Figure 10:
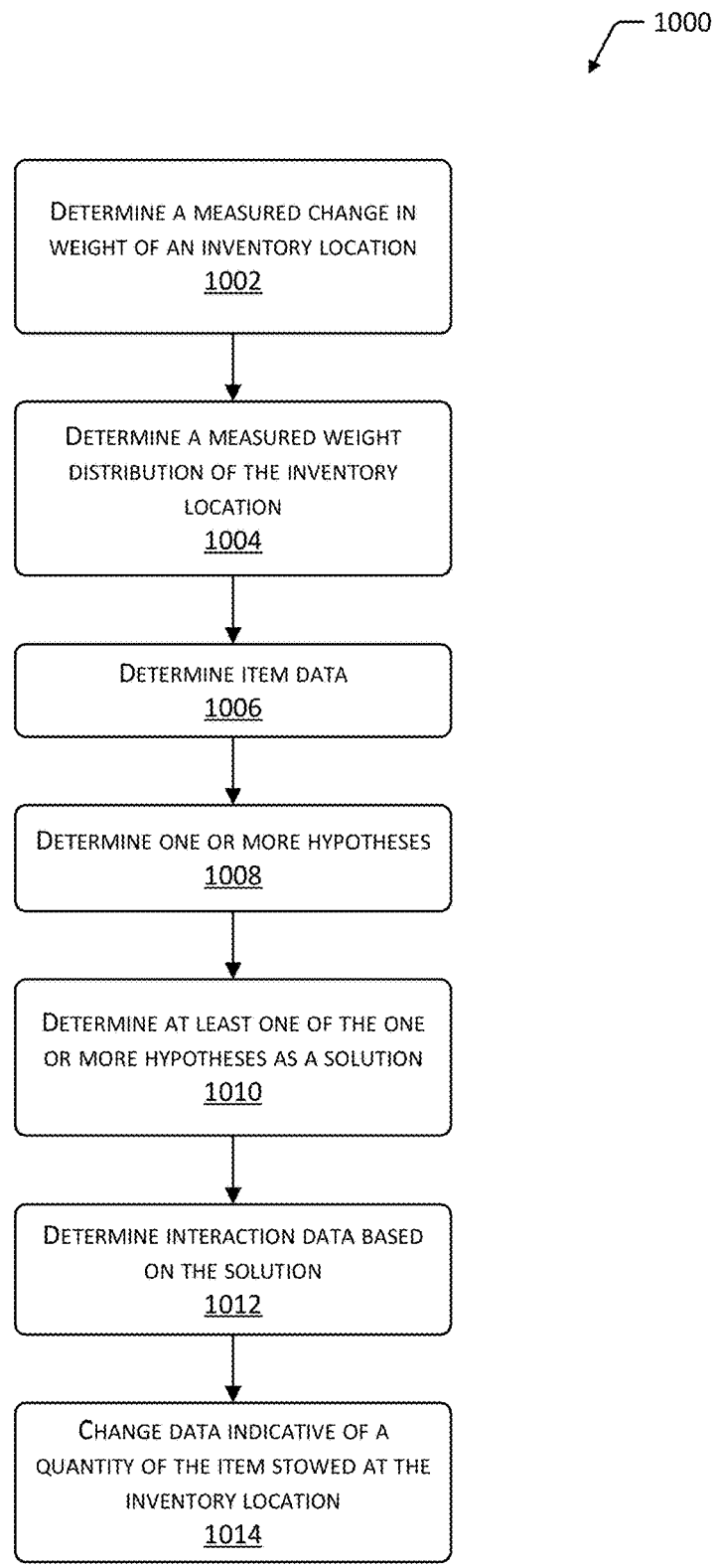
FIG. 10 depicts a flow diagram of another process for generating information indicative of an interaction such as a pick or place of an item, according to some implementations.

FIG. 10 depicts a flow diagram 1000 of another process for generating information indicative of an interaction such as a pick or place of an item 104, according to some implementations. The process may be implemented at least in part by the inventory management module 324. In different implementations, one or more of the blocks described below may be omitted, the sequence of the process using these blocks may vary from that depicted, and so forth.

Block 1002 determines a measured change in weight at the inventory location 114. For example, the weight data 126 obtained at a first time may be subtracted from the weight data 126 obtained at a second time, or vice versa, to generate weight change data 438.

Block 1004 determines a measured weight distribution of the inventory location 114. For example, the weight indicated by weight sensors 120(6) on a left side of the inventory location 114 may be summed to generate a left weight and the weight indicated by weight sensors 120(6) on a right side of the inventory location 114 may be summed to generate a right weight. In some implementations, the weight distribution may also include front or back information, such as obtained from four weight sensors 120(6), each arranged proximate to a different corner of the inventory location 114. The weight distribution may be normalized in some implementations.

Block 1006 determines item data 136. For example, the item data 136 associated with a particular inventory location 114 may be retrieved from the data store 320. The item data 136 may include information about which items 104 are stowed at the inventory location 114, quantity of those items 104, individual weight of an item 104, total weight of the items 104, location such as partitioned area 134 at which the item 104 is stowed, and so forth.

Block 1008 determines hypotheses data 340 that includes one or more hypotheses. This determination may comprise generating the one or more hypotheses, selecting from previously generated hypotheses, and so forth. In one implementation, each hypothesis may include data indicative of predicted quantities of the one or more items 104, a predicted change in weight, a predicted weight distribution, predicted location of weight change, and so forth.

The one or more hypotheses under consideration may be constrained. For example, the one or more hypotheses may be limited to those having the predicted change in weight within a threshold value of the measured change in weight. The threshold value may be an absolute value, a percentage, a ranking such as a top k values of a sorted list, and so forth.

Other constraints may be used as well to limit the number of the one or more hypotheses. For example, constraint data may be determined that is indicative of one or more of a minimum quantity of items 104 or a maximum quantity of items 104 that may be involved in an interaction. Continuing the example, the minimum quantity of items 104 or the maximum quantity of items 104 may be based on the stowage capacity of the inventory location 114 or a portion thereof (such as the partitioned area 134). The one or more hypotheses may then be limited to those hypotheses having predicted quantities bounded by the constraint data.

The constraints may also impose limits such as the number of different types of items 104 (such as distinct item identifiers 402) that an interaction may involve, quantity limits, and so forth. For example, the constraints may specify that interactions involving a net zero change in quantity are permitted, such as when a user 116 may pick an item 104 and place the item 104 back at the inventory location 114 in a single interaction. The constraints may allow for different predicted quantities of different items 104 in the same interaction. For example, the constraints may permit an interaction that involves a contemporaneous pick of one item 104(1) and a place of another item 104(2).

In some implementations, the one or more hypotheses may be precomputed. For example, once the layout of an inventory location 114 has been set that designates the items 104 and their placement within partitioned areas 134, the one or more hypotheses may be generated and stored for later use.

Block 1010 determines, as a solution, at least one of the one or more hypotheses. In some implementations a single hypothesis may be designated as the solution, while in other implementations two or more hypotheses may be combined or merged to form a single solution. The selection may be based on a comparison of the measured weight characteristics with the predicted weight characteristics in the hypotheses. For example, a score based on error data 338 indicative of a probability associated with the difference between measured and predicted values may be determined for each hypothesis. Selection may then be based on the score.

In another example, the hypotheses having predicted weight characteristics with the least variance from the measured weight characteristics may be selected as the solution. The weight characteristics may include a weight change, weight distribution, and so forth. The weight distribution may be described with respect to two or more sides of the inventory location 114. For example, the measured and predicted weight distribution data 440 may designate respective weights at a left side of the inventory location 114 and a right side of the inventory location 114.

In some implementations, the one or more hypotheses and the selection thereof may be based at least in part on placement of the items 104 at the inventory location 114, such as within a particular partitioned area 134. For example, instead of or in addition to the weight distribution, a predicted LWC 706 may be generated using the item data 136 and included in the hypotheses data 340. The hypotheses data 340 may include a predicted LWC 706.

At block 1010, during the determination of the at least one or more hypotheses a measured LWC 706 may be compared with the predicted LWC 706. The predicted LWC 706 may be generated using the predicted quantities of items 104, the partitioned areas 134 associated with the quantities, the known dimensions of the inventory location 114, data about placement of the weight sensors 120(6) relative thereto, and so forth. The measured LWC 706 may be determined using the weight distribution data 440 and the known dimensions of the inventory location 114, data about placement of the weight sensors 120(6) relative thereto, and so forth.

As described above, in some implementations, non-weight data 128 may be used to filter the selection of the solution from the one or more hypotheses. Differences or other discrepancies between the predicted values and the non-weight data 128 may be determined. The discrepancy may be a variation beyond a threshold value, contradictory information, and so forth. The discrepancy may be between the non-weight data 128 and one or more of: the predicted quantity, a predicted partitioned area 134 from which the one or more types of items 104 are added or removed during an interaction, a predicted identification of a particular type of item 104, and so forth. For example, the activity data 336 based on image data 422 or other non-weight data 128 may indicate that a particular partitioned area 134 had some activity such as motion or a change in appearance. This non-weight data 128 may be used to filter and discard particular hypotheses from selection that do not exhibit motion or a change in appearance.

Block 1012 determines interaction data 342 based on the solution. For example, the predicted quantities in the hypothesis selected as the solution may be deemed to represent the actual occurrence at the inventory location 114.

Block 1014 changes, using the interaction data 342, data indicative of a quantity of items 104 stowed at the inventory location 114. For example, the quantity data 412 for a particular item identifier 402 may be changed to the predicted value specified by the hypothesis selected as the solution.

Figure 11:
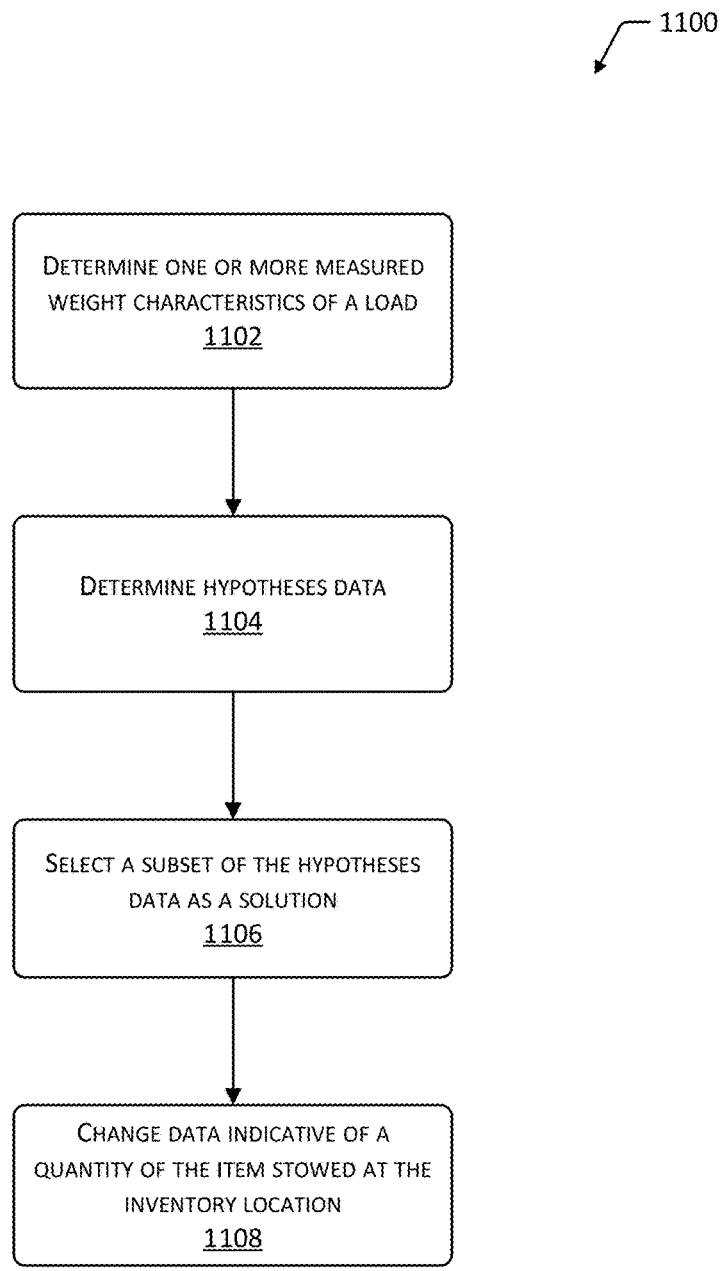
FIG. 11 depicts a flow diagram of another process for generating information indicative of a change in quantity of an item stowed or otherwise held at an inventory location, according to some implementations.

FIG. 11 depicts a flow diagram 1100 of another process for generating information indicative of a change in quantity of an item 104 stowed at an inventory location 114, according to some implementations. The process may be implemented at least in part by the inventory management module 324. In different implementations, one or more of the blocks described below may be omitted, the sequence of the process using these blocks may vary from that depicted, and so forth.

Block 1102 determines one or more measured weight characteristics of a load. In one implementation, this may include determining a measured change in weight of the load between a first time and a second time and determining a measured weight distribution of the load. The measured change in weight and the measured weight distribution may be stored as the one or more measured weight characteristics.

In another implementation, the determination of the one or more measured weight characteristics of the load may include determining a change in weight of the load between a first time and a second time. A first weight distribution of the load at the first time may be determined at a first time. A second weight distribution of the load may be determined at a second time. A change in the weight distribution may be determined based on the first weight distribution and the second weight distribution. For example, the change in weight distribution may be expressed as a change in left weight and right weight, as a ratio of change of left weight to right weight, and so forth. The change in weight and the change in weight distribution may be stored as the one or more measured weight characteristics.

Block 1104 determines hypotheses data 340 indicative of one or more of additions or removals of predicted quantities of items 104 from the load. The hypotheses data 340 may be limited to hypotheses in which a predicted weight characteristic for the hypotheses data 340 is within a first threshold of the one or more of the measured weight characteristics.

The determination of the hypotheses data 340 may be based on data indicative of one or more of physical dimensions of a platform supporting the load, weight of particular items 104 associated with the load, particular locations (such as partitioned areas 134) for stowage on the platform holding the load, and so forth. For the predicted quantities at one or more of the particular locations, a predicted change in weight and a predicted LWC 706 may be calculated. The one or more of the predicted quantities, data indicative of the one or more particular locations, the predicted LWC 706, or the predicted change in weight may be stored as the hypotheses data 340.

The hypotheses data 340 may be generated during the process 1100 or may be precomputed, stored, and accessed prior to operation of block 1102. For example, the hypotheses data 340 for a particular inventory location 114 and configuration of items 104 stowed therein may be generated and stored for later use. In some implementations, only a portion of the data may be precomputed. For example, the predicted weight changes may be determined in advance while the predicted weight distribution, predicted LWC 706, and so forth, may be determined during the process.

Block 1106 determines, as a solution, a subset of the hypotheses data 340 based on correspondence to at least a portion of the one or more weight characteristics. For example, the hypotheses in the hypotheses data 340 that have the highest score indicative of a probability that variance between the measured and predicted weight characteristic is the result of a sensor error, and not a measured change in the load, may be selected. In another example, the hypotheses in the hypotheses data 340 that have predicted weight characteristics within a threshold value of the measured weight characteristics may be selected. In still another example, a combination of probability data and threshold values may be used to select the subset.

In one implementation, the hypotheses in the hypotheses data 340 may be scored according to their correspondence to the measured data, and then ranked according to the score. For example, the hypotheses in the subset of the hypotheses data 340 may be scored based on deviation in the predicted values from one or more of one or more measured weight characteristics. This score may then be used to rank or sort the hypotheses for selection as the solution. In another implementation, the ranking may be based on the error data 338 indicative of a probability density function that accounts for errors or noise in the weight data 126 as described above.

In some implementations, non-weight data 128 may be used to select the subset of the hypotheses data 340. For example, non-weight data 128 may be acquired from one or more non-weight sensors 120. The activity data 336 may be generated from the non-weight data 128 and used to select, rank, or otherwise determine the at least one hypothesis in the hypotheses data 340 that is to be deemed the solution.

In some implementations, measurement error associated with the weight data 126 may be normalized for one or more of the weight sensors 120(6) measuring the load. For example, the measurement error may occur as a result of drift in the circuitry of the weight sensor 120(6). The normalized measurement error may then be used to score the hypotheses in the hypotheses data 340, select the solution, and so forth. For example, the score calculated for a hypothesis may include as the probabilities from the error data 338 of values of the normalized measurement errors. Continuing the example, given two hypotheses that correspond with approximately the same variance with respect to the measured weight characteristics, the hypothesis having the higher probability that variation between the measured and predicted values is due to sensor error may be deemed the solution.

Block 1108 changes data indicative of a quantity of the item 104 stowed at the inventory location 114 based on the solution. For example, based on the solution selected, the quantity data 412 for a particular item identifier 402 at a particular inventory location 114 may be changed.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a shelf to hold one or more types of items;
a plurality of weight sensors;
a plurality of non-weight sensors; and
a computing device comprising:
   a memory, storing computer-executable instructions; and
   a hardware processor to execute the computer-executable instructions to:
      access first weight data acquired by the plurality of weight sensors at a first time;
      access second weight data acquired by the plurality of weight sensors at a second time;
      determine one or more weight characteristics based on the first weight data and the second weight data;
      determine a set of hypotheses based on the one or more weight characteristics, wherein each hypothesis in the set of hypotheses comprises one or more of:
         a predicted type of item,
         a predicted quantity of the type of item, or
         a predicted partitioned area;
      access non-weight data acquired by the plurality of non-weight sensors between the first time and the second time;
      determine activity data based on the non-weight data;
      determine, based on the activity data, a subset of hypotheses from the set of hypotheses;
      determine a ranking of the hypotheses in the subset of hypotheses; and
      determine a solution based on the ranking of the hypotheses in the subset of hypotheses.

2. The system of claim 1, the hardware processor to further execute the computer-executable instructions to:
determine the activity data indicates an activity at one of a plurality of partitioned areas of the shelf; and
exclude, from the subset of hypotheses, those hypotheses in the set of hypotheses in which the predicted partitioned area is not the one of the plurality of partitioned areas of the shelf.

3. The system of claim 1, the hardware processor to further execute the computer-executable instructions to:
determine one or more discrepancies between the hypotheses in the set of hypotheses and the activity data, wherein the one or more discrepancies comprise a variation beyond a threshold value or contradictory information; and
exclude, from the subset of hypotheses, those hypotheses in the set of hypotheses that exhibit the one or more discrepancies.

4. A system comprising:
an inventory location;
a plurality of weight sensors;
a plurality of non-weight sensors; and
a computing device comprising:
   a memory, storing computer-executable instructions; and
   a hardware processor to execute the computer-executable instructions to:
      determine one or more measured weight characteristics of the inventory location based on weight data acquired from one or more of the plurality of weight sensors;
      determine a set of hypotheses based on the one or more measured weight characteristics, wherein each hypothesis in the set of hypotheses comprises predicted weight characteristics that are within a threshold value of at least one of the one or more measured weight characteristics;
      determine activity data at the inventory location based on non-weight data acquired from one or more of the plurality of non-weight sensors;
      determine a subset of hypotheses from the set of hypotheses based on the activity data; and
      determine, as a solution, at least one of the hypotheses in the subset of hypotheses.

5. The system of claim 4, wherein the plurality of non-weight sensors comprises a proximity sensor; and the hardware processor to further execute the computer-executable instructions to:
access proximity data from the proximity sensor;
determine a user is within a threshold distance of the inventory location based on the proximity data; and
wherein the activity data is determined based on the determination that the user is within a threshold distance of the inventory location.

6. The system of claim 4, wherein the activity data includes one or more of:
location data,
motion data,
duration data, or
a user identifier.

7. The system of claim 4, the hardware processor to further execute the computer-executable instructions to:
determine an activity has been detected at a partitioned area of the inventory location, based on the activity data; and
disregard hypotheses from the set of hypotheses that do not correspond to the partitioned area of the inventory location.

8. The system of claim 4, the hardware processor to further execute the computer-executable instructions to:
determine an activity has been detected at a partitioned area of the inventory location, based on the activity data;
select one of the hypotheses in the subset of hypotheses that involves the activity at the partitioned area of the inventory location as the solution;
access item data associated with a type of item at the partitioned area; and
generate interaction data associated with the type of item, based on the one of the hypotheses in the subset of hypotheses that is selected.

9. The system of claim 8, wherein the interaction data indicates a type of interaction and a quantity of the type of item involved in the interaction; and the hardware processor to further execute the computer-executable instructions to:
update an inventory quantity of the type of item at the partitioned area based on the interaction data.

10. The system of claim 4, wherein the plurality of non-weight sensors comprises a camera; and the hardware processor to further execute the computer-executable instructions to:
access image data from the camera, wherein the activity data is determined based on the image data, and wherein the activity data indicates presence of a hand of a user at a partitioned area of the inventory location; and
disregard hypotheses from the set of hypotheses that do not correspond to the partitioned area.

11. The system of claim 4, the hardware processor to further execute the computer-executable instructions to:
determine one or more discrepancies between the non-weight data and one or more predicted values from the hypotheses in the set of hypotheses; and
determine the subset of hypotheses based on the activity data and the one or more discrepancies.

12. The system of claim 11, wherein the one or more discrepancies represent differences in one or more of:
a predicted quantity of a type of item,
a predicted partitioned area, or
a predicted identification of a particular type of item.

13. The system of claim 4, the hardware processor to further execute the computer-executable instructions to:
access constraint data associated with one or more types of items stowed at the inventory location;
access error data associated with one or more of the plurality of weight sensors; and
disregard one or more hypotheses based on one or more of the constraint data or the error data.

14. A method comprising:
accessing weight data associated with an inventory location, as acquired by one or more weight sensors;
determining a set of hypotheses based on the weight data, wherein each of the hypotheses in the set of hypotheses comprises one or more predicted values;
accessing non-weight data associated with the inventory location, as acquired by one or more non-weight sensors;
determining activity data associated with the inventory location based on the non-weight data; and
using the activity data to select or disregard at least one hypothesis from the set of hypotheses.

15. The method of claim 14, further comprising:
determining a measured change in weight at the inventory location based on the weight data;
determining a measured change in weight distribution at the inventory location based on the weight data; and
wherein the set of hypotheses is determined based on one or more of the measured change in weight or the measured change in weight distribution.

16. The method of claim 14, wherein the activity data is representative of one or more of:
motion at the inventory location,
a change in appearance at the inventory location,
presence of a hand of a user at the inventory location,
an activity at a partitioned area of the inventory location,
an identification of a type of item added to or removed from the inventory location, or
a quantity of the type of item added to or removed from the inventory location.

17. The method of claim 14, further comprising:
determining the activity data represents an activity at a partitioned area of the inventory location; and
selecting a hypothesis from the set of hypotheses corresponding to the partitioned area of the inventory location as a solution for describing an interaction at the inventory location.

18. The method of claim 14, wherein the one or more predicted values comprise one or more of:
a predicted type of item,
a predicted quantity of the type of item, or
a predicted partitioned area of the inventory location.

19. The method of claim 18, further comprising:
determining the activity data indicates a type of item, a quantity of the type of item, or a partitioned area of the inventory location;
determining a subset of hypotheses from the set of hypotheses in which the predicted type of item matches the type of item, the predicted quantity of the type of item matches the quantity of the type of item, or the predicted partitioned area matches the partitioned area of the inventory location; and
selecting at least one hypothesis from the subset of hypotheses as a solution for describing an interaction at the inventory location.

20. The method of claim 14, further comprising:
determining a score for each hypothesis in the set of hypotheses;
ranking the hypotheses in the set of hypotheses based on the score and the activity data; and
selecting, as a solution, a hypothesis from the set of hypotheses that has a highest ranking.

\* \* \* \* \*